US008239813B2

(12) United States Patent
Nikitin et al.

(10) Patent No.: US 8,239,813 B2
(45) Date of Patent: Aug. 7, 2012

(54) METHOD AND APPARATUS FOR BALANCING SIGNAL DELAY SKEW

(75) Inventors: Andrey Nikitin, Moscow (RU); Ranko Scepanovic, San Jose, CA (US); Igor Kucherenko, Moscow (RU); William Lau, Foster City, CA (US); Cheng-Gang Kong, Saratoga, CA (US); Hui-Yin Seto, San Jose, CA (US); Andrej Zolotykih, Fryazino (RU); Ivan Pavisic, San Jose, CA (US); Sandeep Bhutani, Pleasanton, CA (US); Aiguo Lu, Pleasanton, CA (US); Ilya Lyalin, Moscow (RU)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/173,855

(22) Filed: Jun. 30, 2011

(65) Prior Publication Data

US 2011/0258587 A1 Oct. 20, 2011

Related U.S. Application Data

(62) Division of application No. 12/015,925, filed on Jan. 17, 2008, now Pat. No. 7,996,804.

(51) Int. Cl.
G06F 17/50 (2006.01)
G06F 9/455 (2006.01)

(52) U.S. Cl. ........ 716/134; 716/103; 716/107; 716/108; 716/113; 716/131; 716/132

(58) Field of Classification Search .................. 716/103, 716/107–108, 113, 131, 132, 134
See application file for complete search history.

(56) References Cited

U.S. PATENT DOCUMENTS

| 5,666,290 | A  | * | 9/1997 | Li et al. ........................ 716/113 |
| 6,223,328 | B1 | * | 4/2001 | Ito et al. ....................... 716/113 |
| 6,412,101 | B1 | * | 6/2002 | Chang et al. .................. 716/104 |
| 6,550,044 | B1 |   | 4/2003 | Pavisic et al. |
| 6,578,183 | B2 | * | 6/2003 | Cheong et al. ............... 716/113 |
| 6,601,227 | B1 | * | 7/2003 | Trimberger .................. 716/113 |
| 6,782,520 | B1 |   | 8/2004 | Igusa et al. |
| 7,047,504 | B2 |   | 5/2006 | Kawano |
| 7,694,242 | B1 |   | 4/2010 | Li et al. |
| 7,945,880 | B1 | * | 5/2011 | Albrecht et al. ............. 716/105 |

OTHER PUBLICATIONS

Restriction Requirement from the United States Patent and Trademark Office for corresponding U.S. Appl. No. 12/015,925, dated Jul. 12, 2010.
Office Action from the United States Patent and Trademark Office for corresponding U.S. Appl. No. 12/015,925, dated Aug. 24, 2010.
Notice of Allowance from the United States Patent and Trademark Office for corresponding U.S. Appl. No. 12/015,925, dated Feb. 16, 2011.

* cited by examiner

Primary Examiner — Nghia Doan
(74) Attorney, Agent, or Firm — David D. Brush; Westman, Champlin & Kelly, P.A.

(57) ABSTRACT

A system and method are provided for reducing the signal delay skew is disclosed, according to a variety of embodiments. One illustrative embodiment of the present disclosure is directed to a method. According to one illustrative embodiment, the method includes receiving an initial netlist having components and connection paths among the components; identifying a first connection path in the initial netlist that comprises path fragments for which there are no equivalent path fragments in a second connection path in the initial netlist; generating a skew-corrected netlist wherein the second connection path is re-routed to have path fragments equivalent to the path fragments of the first connection path; and outputting the skew-corrected netlist.

17 Claims, 18 Drawing Sheets

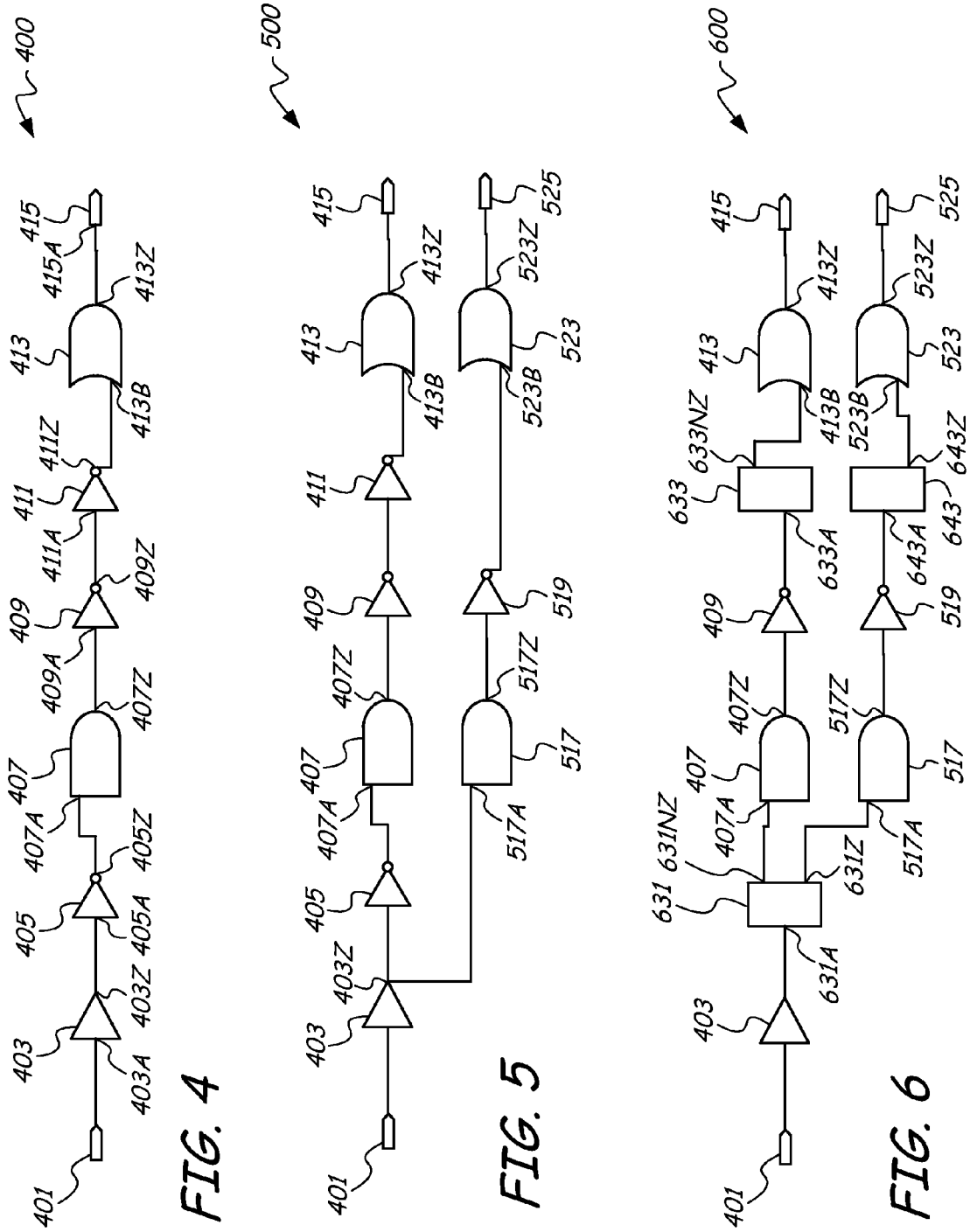

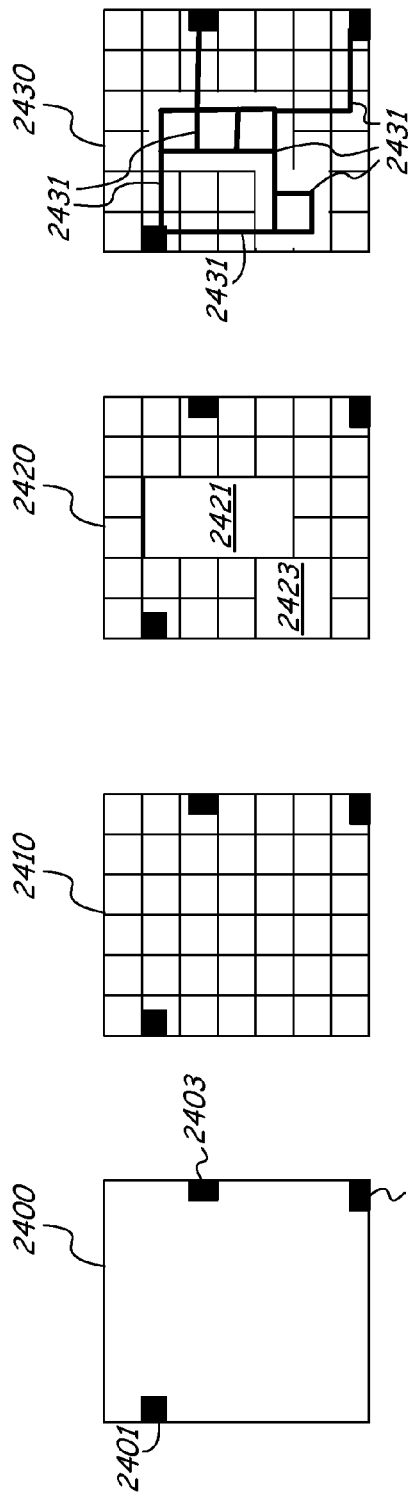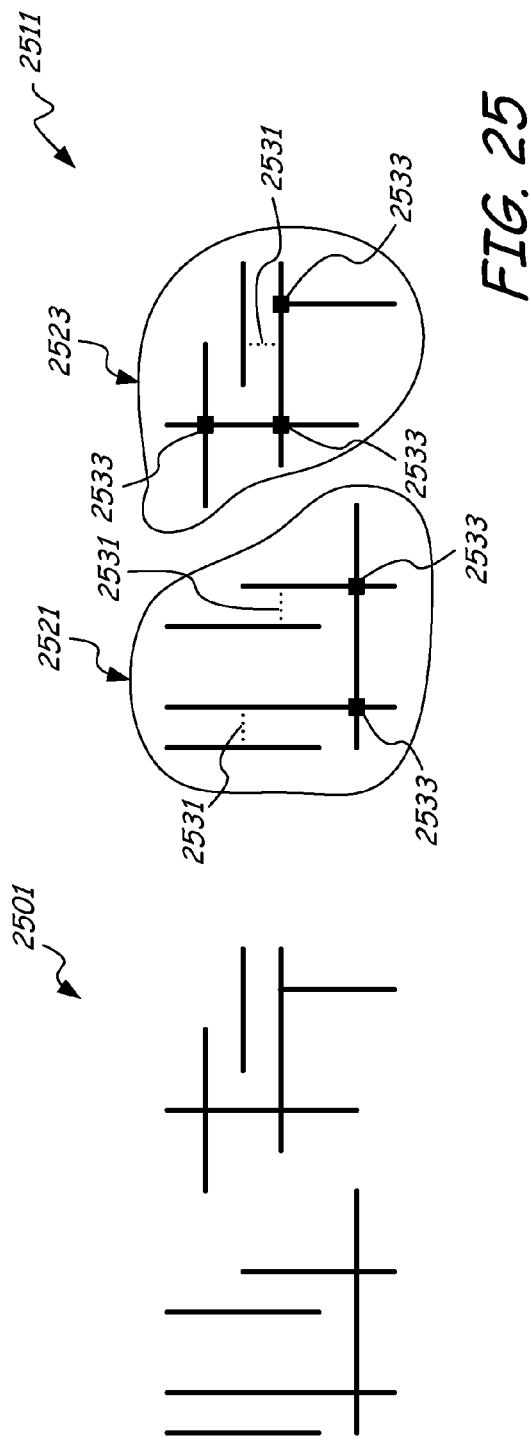

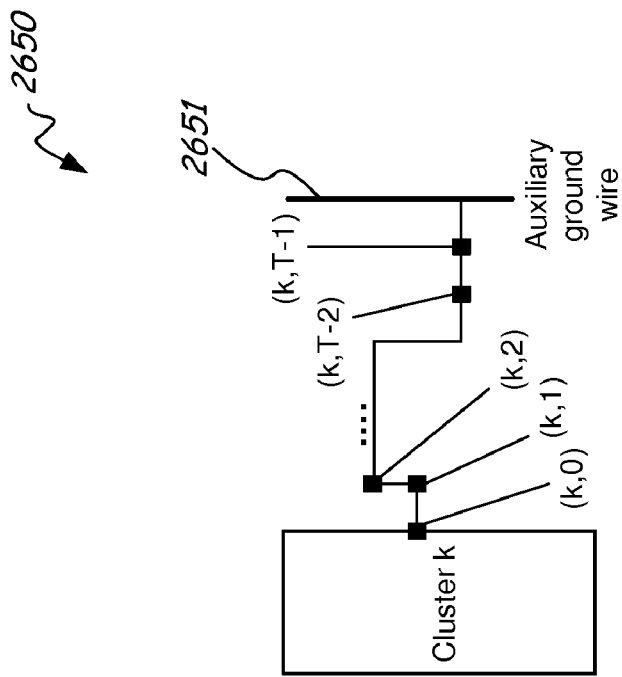
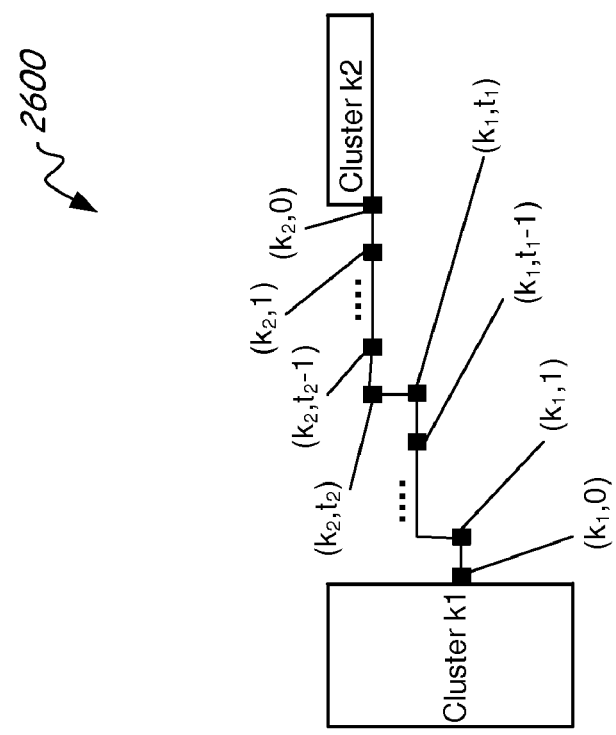
FIG. 26

METHOD AND APPARATUS FOR BALANCING SIGNAL DELAY SKEW

CROSS-REFERENCE TO RELATED APPLICATION

The present application is a divisional of and claims priority from U.S. patent application Ser. No. 12/015,925, filed Jan. 17, 2008, the content of which is hereby incorporated by reference in its entirety.

FIELD OF THE DISCLOSURE

The present disclosure relates to electrical circuits. More particularly, the present disclosure relates to a system for reducing delay skews in the propagation of signals, such as in digital logic circuits.

BACKGROUND OF THE INVENTION

Semiconductor integrated circuits often incorporate hundreds of thousands of semiconductor elements on a single chip. These elements are interconnected to perform a desired function.

There are many applications that require precise delay skew control across a group of signals in the design of digital logic circuitry. Delay skew is often defined as the variation or delta in propagation delays among such a group of signals.

A source synchronous interface is an example of a general category of a type of application that often requires precise delay skew control. A source synchronous interface is a parallel data transfer bus, which typically includes a group of data signals and reference clock signals. Both the data signals and the reference clock signals need to travel through equal propagation delays and arrive at their respective destinations at the same time, to within a relatively small margin of error, in order to be sampled correctly.

One particular type of source synchronous interface is referred to as a double data rate (DDR) interface in which data is transferred on each half-cycle of the reference clock. In this type of interface, duty cycle distortion (i.e., rise time and fall time differences) also needs to be minimized to provide the optimal data sampling window when the data is sampled at the destination.

In addition to the source synchronous interface application, another area that often requires precise delay skew management is the area of clock synthesis across heterogeneous logic blocks in integrated circuits (IC) implementations. Due to the heterogeneity of different logic blocks, the various clock signals of the global clock tree may diverge into a wide variety of differences in their delay at the clock end points, disrupting logic processing across the IC.

In a typical IC design environment, the delay skew management is achieved through a tedious manual iterative manner. The process typically starts with an initial trial run with the physical design tool. It then feeds back the initial design to the design group for timing analysis to determine whether the initial design fits the requirements. If not, the process repeats again through enough iterations until the design converges to an acceptable result. Since skew requirements have to be observed across all manufacturing process ranges as well as all operating conditions such as voltage and temperature ranges (PVT), the process can be very time-consuming and the result may not be able to satisfy all PVT conditions. Improved systems and methods for reducing signal delay skew would therefore provide broad advantages for a wide range of digital circuitry.

The discussion above is merely provided for general background information and is not intended to be used as an aid in determining the scope of the claimed subject matter, nor does it identify any needs or problems recognized in the art.

SUMMARY

An aspect of the present disclosure is directed to a method. According to one illustrative embodiment, the method includes the following steps with a computing device: receiving an initial netlist comprising components and connection paths among the components; identifying a first connection path in the initial netlist that comprises path fragments for which there are no equivalent path fragments in a second connection path in the initial netlist; generating a skew-corrected netlist wherein the second connection path is re-routed to have path fragments equivalent to the path fragments of the first connection path; and outputting the skew-corrected netlist.

Another aspect of the present disclosure is directed to a method, which includes performing the following steps with a computing device: receiving an initial netlist comprising components and connection paths among the components; identifying a skew group comprising the connection paths, including at least the first connection path and the second connection path, in the initial netlist; generating a skew-corrected netlist that comprises equivalent grounded shielding wires disposed adjacent to at least a portion of each of the connection paths in the skew group; and outputting the skew-corrected netlist.

Another aspect of the present disclosure is directed to a non-transitory medium having executable instructions capable of being read and executed by a computing system and thereby configuring the computing system to receive a logic design and to provide a corresponding physical design embodying the logic design. The computing system executing the instructions performs a method comprising: receiving an initial netlist comprising components and connection paths among the components; identifying a first connection path in the initial netlist that comprises path fragments for which there are no equivalent path fragments in a second connection path in the initial netlist; generating a skew-corrected netlist wherein the second connection path is re-routed to have path fragments equivalent to the path fragments of the first connection path; and outputting the skew-corrected netlist.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 depicts a block diagram for a connection path involved in a path equalization process, according to one illustrative embodiment.

FIG. 5 depicts a block diagram for a set of connection paths involved in a path equalization process, according to one illustrative embodiment.

FIG. 6 depicts a block diagram for a set of connection paths involved in a path equalization process, according to one illustrative embodiment.

FIG. 24 depicts block diagrams for a set of connection paths involved in an equivalent routing shielding process, according to one illustrative embodiment.

FIG. 25 depicts block diagrams for a set of connection paths involved in an equivalent routing shielding process, according to one illustrative embodiment.

FIG. 26 depicts block diagrams for a set of connection paths involved in an equivalent routing shielding process, according to one illustrative embodiment.

DETAILED DESCRIPTION OF ILLUSTRATIVE EMBODIMENTS

Figure 1:
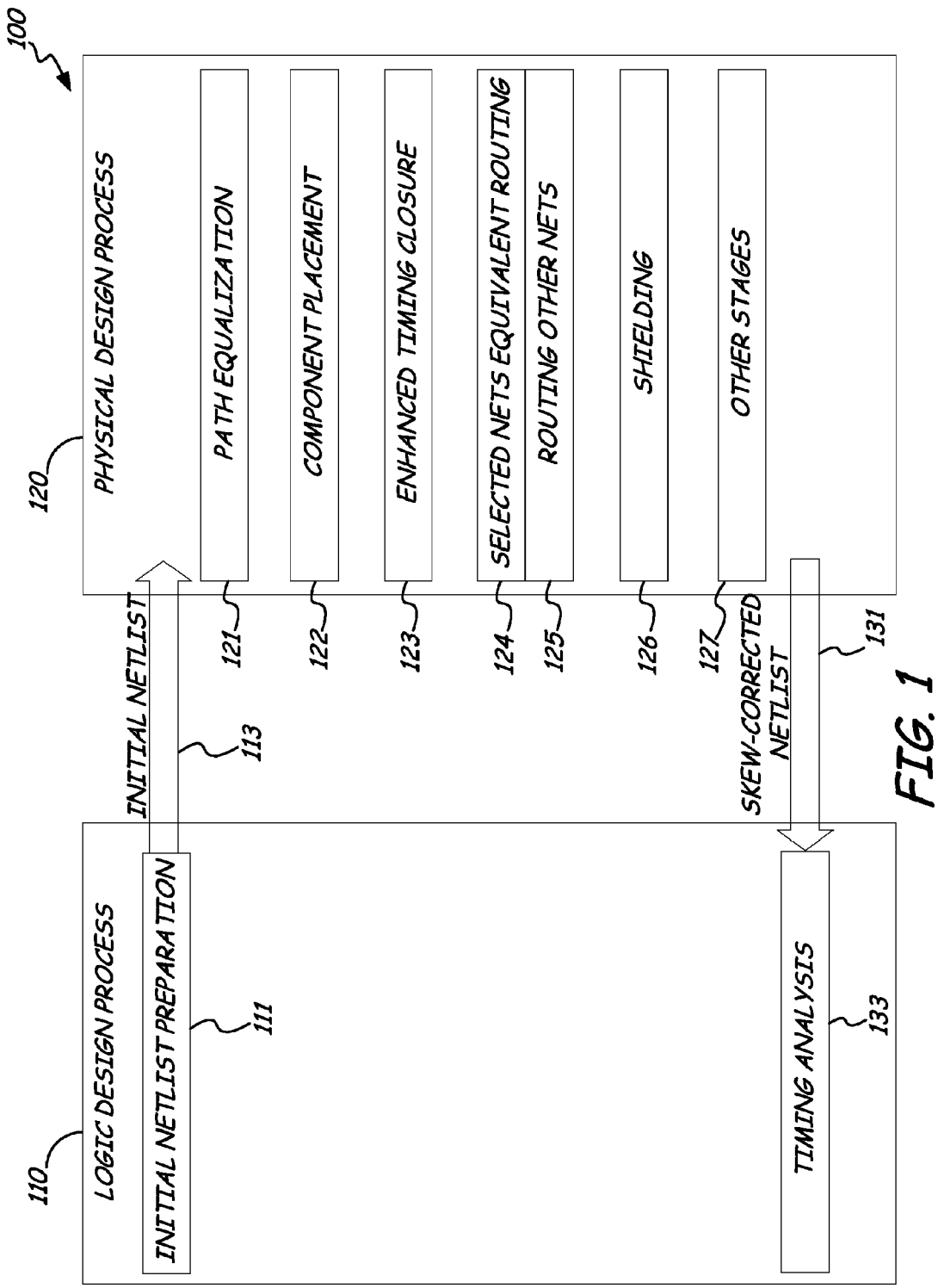
FIG. 1 provides a block diagram depicting a process for reducing a signal delay skew in an integrated circuit implementation, according to an illustrative embodiment.

FIG. 1 provides a block diagram that illustrates a process 100 configured for reducing or minimizing signal delay skew, illustratively including data signal delay skew, reference clock signal delay skew, or duty cycle distortion, for example, in an integrated circuit implementation, for a signal propagation tree or network such as a single data rate or double data rate (DDR) source synchronous interface, or heterogeneous logic blocks in a wide variety of circuitry implementations, such as integrated circuit (IC) implementations, and computer motherboard and other circuit board implementations, for example. Such skew may take the form of differences, along different connection paths within one signal propagation tree, in signal timing delays, ramp-up or ramp-down times for a signal duty cycle, and aspects affecting signals such as voltage, capacitance, and temperature. The signal propagation tree may include a single data rate source synchronous interface, a double data rate (DDR) source synchronous interface, a heterogeneous logic block global clock tree, or other forms, in different embodiments.

A group of signal-propagating connection paths with a common or parallel signal origin and subject to potentially different influences on the signal along different connection paths, may be considered to form a single skew group, and the design for the physical implementation of such a skew group may be referred to as a netlist. Reducing the skew of a netlist involves modifying the physical design of a skew group to reduce any factor that influences the skew between any aspects of a signal across two or more connection paths of that skew group. Process 100 for reducing delay skew reduces the turn-around-time of a skew reduction process as part of the process of establishing the design of an integrated circuit implementation, according to an illustrative embodiment. Process 100 may be implemented in a wide variety of embodiments, illustratively including software comprising computer-executable instructions or other design tools, for example.

Process 100 includes a logic design process 110 and a physical design process 120 for producing a physical implementation of a logic design produced by logic design process 110. Logic design process 110 includes element 111 of preparing an initial netlist 113, which is provided to the physical design process 120 for designing a physical implementation of the logic design. According to one illustrative embodiment, the initial netlist 113 includes a physical design for components and signal connection paths among those components. The components may include any of a variety of logic components and other associated components. Illustrative examples of such components and signal connection paths are considered below. The initial netlist may be modified, such as to provide a skew-corrected netlist, as discussed below. The physical design of the netlist may then be used to manufacture a product, such as an integrated circuit implementation, in accordance with the physical design.

Physical design process 120 includes a variety of stages that may potentially be included in various embodiments, and which are considered in further detail below. These include path equalization stage 121, component placement stage 122, enhanced timing closure stage 123, selected nets equivalent routing stage 124, routing other nets stage 125, shielding stage 126, and other stages 127, for example. Different embodiments may include any combination of stages selected from among these and other examples. The end product of the physical design process 120 is a skew-corrected netlist 131 that is provided back to the logic design process 110, where it may be subjected to a timing analysis stage 133.

Design specifications that must be met for the physical design include, for example, maintenance of skew delay and duty cycle timing across all netlists or signal propagation trees within the circuit implementation, within a rigorous margin of error across a wide range for a variety of operating condition variables, such as temperature and voltage. In traditional methods of integrated circuit design, a timing analysis stage generally reveals a large number of different run scenarios in which the circuit design does not fulfill the design specifications in some way, and the results of the timing analysis must be used to start another iteration of the physical design process to try to address the design failures, and such a cycle of design modification and timing analysis must be reiterated, often through tens of iterations, often requiring months of labor by a design team. In sharp contrast, the present disclosure provides for a systematic method of assuring a sufficiently reduced skew delay for a physical design with a single iteration of the physical design process. This prospectively assured single iteration physical design removes the uncertainty and guesswork out of the physical design process, reducing its required time to a time frame of mere days or hours or less, instead of several months, to complete the single needed physical design iteration and arrive at a specification-compliant physical design.

Figure 2:
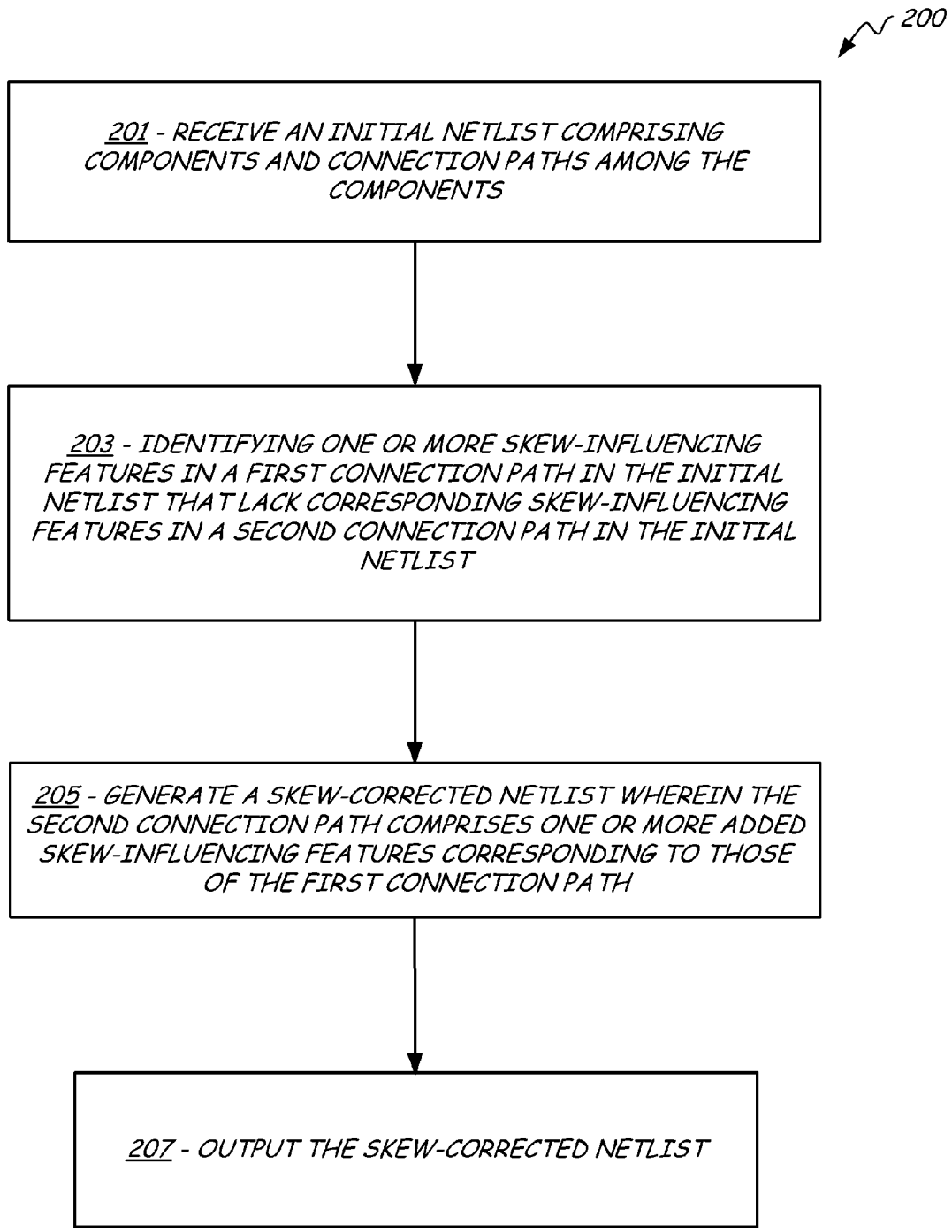
FIG. 2 depicts a flowchart illustrating a method for reducing a signal delay skew in an integrated circuit implementation, according to one illustrative embodiment.

FIG. 2 depicts a flowchart for a method 200 of performing the physical design process 120 of FIG. 1 in accordance with an illustrative embodiment. Method 200 includes step 201, of receiving an initial netlist comprising components and connection paths among the components. The netlist involves the components and connection paths included in a single signal propagation tree specified by the logic design, that is to be embodied in a physical design, according to an illustrative embodiment. Method 200 further includes step 203, of identifying one or more skew-influencing features in a first connection path in the initial netlist that lack corresponding skew-influencing features in a second connection path in the initial netlist. Skew-influencing features may be taken to be corresponding if they are equivalent to, or have an equivalent effect on skew timing, for example. These can include any features that can affect the signal timing skew, such as driver pins, receiver pins, or components such as buffers, inverters, AND gates, OR gates, NAND gates, NOR gates, XAND gates, XOR gates, splitters, multiplexers, or demultiplexers, as illustrative examples in an integrated circuit implementation, or such as integrated circuits and other components in an illustrative circuit board implementation, for example. This may also be done for any connection paths that lack skew-influencing features found in any other connection paths within a netlist.

Step 205 includes generating a skew-corrected netlist wherein the second connection path comprises one or more added skew-influencing features corresponding to those of the first connection path, within the physical design of the netlist. Again, this may include adding corresponding skew-influencing features to any connection paths that are found lacking in skew-influencing features corresponding to those of other connection paths, where any of the lacking connection paths may assume the role of the "second" connection path to which such features are added, to correspond to those of any other connection path in the netlist that may be taken to be the "first" connection path. Steps 203 and 205 may therefore also include identifying one or more skew-influencing features in the second connection path in the initial netlist that lack corresponding skew-influencing features in the first connection path in the initial netlist, and providing one or more added skew-influencing features to the first connection path that correspond to those of the second connection path. The netlist thus provided is "skew-corrected" in that at least one feature of one connection path is indicated to be modified to provide for a reduced skew difference relative to another connection path in the same skew group, where a skew group may for example be any combination of connection paths with a common source signal, and two or more components in different signal connection paths downstream of the source signal such that they may potentially be affected by a timing skew along those connection paths. This may include connection paths for data signals, reference clock signals, and so forth.

Method 200 also includes step 207, of outputting the skew-corrected netlist. Such a skew-corrected netlist is therefore also a physical design which may subsequently be used for manufacturing integrated circuit implementations based on the skew-corrected netlist.

Method 200 therefore provides a prospectively systematic, single-iteration process for reducing or minimizing skew timing differences along different connection paths of a netlist, where such skew timing difference reduction remains effective across a wide range of temperatures, voltages, and other operating conditions. Different illustrative aspects of the skew reduction system include equalizing connection paths, enhanced timing closure, equivalent routing for corresponding nets of a common skew group, and ground shielding for equivalent routes, for example. Any one of or combination of these aspects may be used in different embodiments, within the general method involving any aspect of generating and outputting a skew-corrected netlist that is indicated to include a reduced difference in skew timing between at least two connection paths within the netlist, relative to the initial netlist.

Method 200 may, for example, further include accompanying any transformation of one connection path, or the components on the connection path, with equivalent transformations of other, parallel connection paths within the same skew group. This may be referred to as enhanced timing closure. For example, this may include adding or subtracting a component of a certain type in one connection path in a netlist, and accompanying that addition or subtraction of that component with a corresponding addition or subtraction of a component of the same type to the other connection paths in the netlist. Enhanced timing closure is able to resolve ramptime violations, setup and hold time violations, and otherwise satisfy timing constraints, by making equivalent transformations of different connection paths of the same skew group. For example, if a buffer, inverter, or other component is added to or removed from one fragment of one connection path within a skew group, then the same type of component is added to or removed from the corresponding fragment of other connection paths within the skew group. More specific illustrative examples of this are provided below, in connection with other aspects of reducing skew across a netlist.

Figure 3:
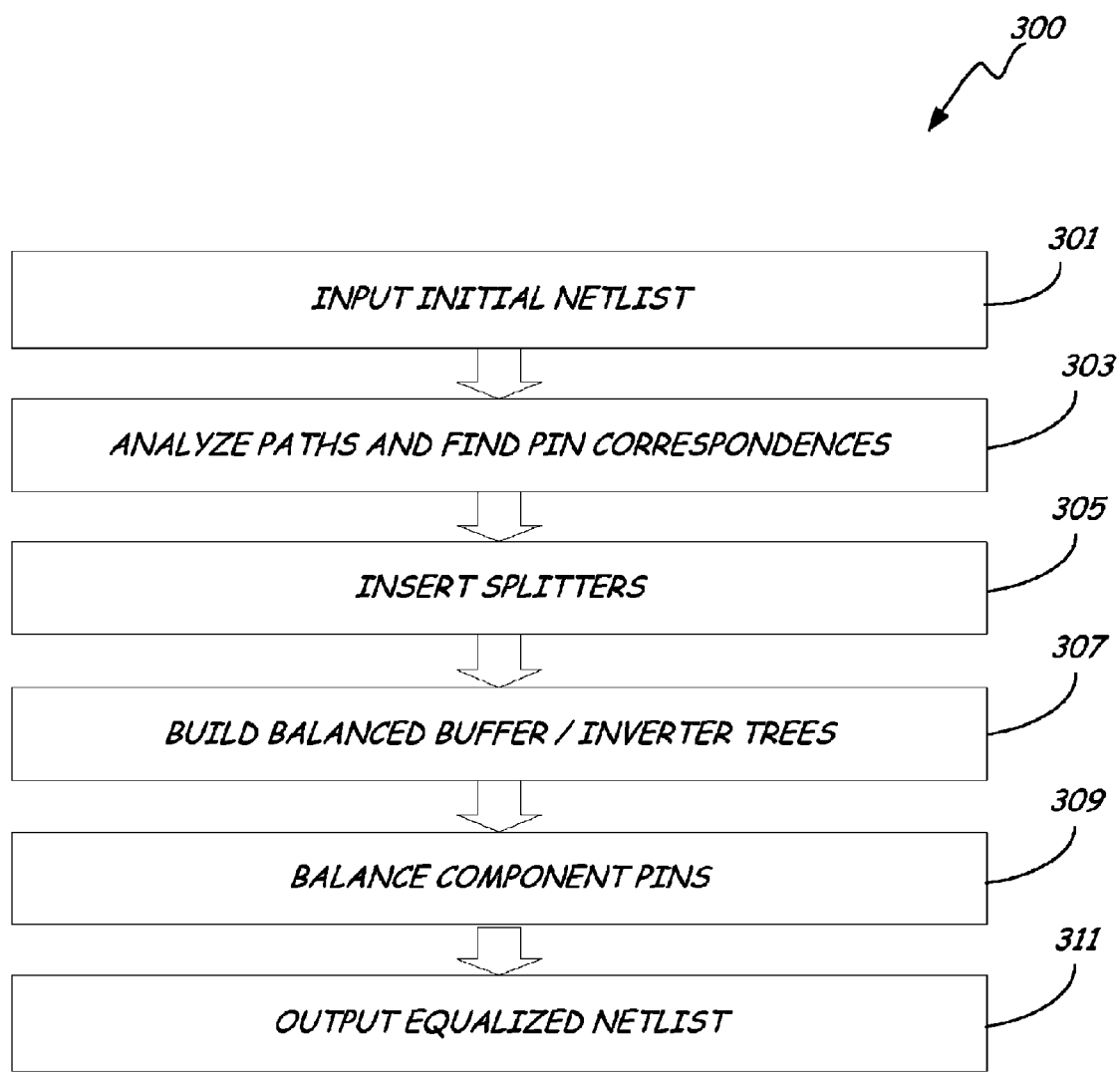
FIG. 3 depicts a flowchart illustrating a method for equalizing various connection paths of an integrated circuit netlist, according to one illustrative embodiment.

FIG. 3 provides a flowchart for a method 300 according to another illustrative embodiment that focuses on performing path equalization as an illustrative aspect of the system for correcting or reducing skew on a netlist. Other examples also exist and can include the addition of one or more steps not shown in FIG. 3, the elimination of one or more steps, or the performances of steps in a different order, for example. FIGS. 4-11 provide block diagrams illustrating components and connection paths of a netlist at different stages in a path equalization process, following method 300 as illustrated in FIG. 3. Path equalization addresses the connection paths belonging to a skew group, and includes making transformations of the netlist for the skew group, to make the different connection paths equivalent to each other, or otherwise reduce the skew between the different paths, without altering their functionality. Different paths can be considered to be equivalent to each other if the paths have the same number of components of the same types, and if the paths have equivalent driver pins and equivalent sets of receiver pins. This may include transformations of one or more paths in a skew group to cause different paths to have the same numbers of buffers, the same numbers of inverters, equivalent fanouts of nets, and so forth, thereby reducing skew differentials across the different paths and instead providing for equivalent signal timing across the different paths. Path equalization may also include reducing the number of fanout nets on the paths of a skew group.

As depicted in FIG. 3, method 300 begins with step 301, of inputting an initial netlist, and next includes step 303, of analyzing connection paths and finding pin correspondences, which is discussed as follows, in accordance with an illustrative example.

Each connection path of a skew group can be referenced as a list of pins that lie along that path. This can be considered with regard to the illustrative example of netlist 400 of FIG. 4. The list of pins in along netlist 400 includes the following sequence: 401-403A-403Z-405A-405Z-407A-407Z-409A-409Z-411A-411Z-413B-413Z-415. In this list of pins, the reference number suffix A refers to first input pins of a given component; the reference number suffix B refers to a second input pin for a component; and the reference number suffix Z refers to an output pin of a component. Among the components included in this netlist, component 401 is a driver pin, component 403 is a buffer, components 405, 409, and 411 are inverters, component 407 is an AND gate, component 413 is an OR gate, and component 415 is a receiver pin. Driver pin 401 provides the input for netlist 400 while receiver pin 415 provides the output for netlist 400. Input pins 407A and 413B also serve as local receiver pins while output pins 407Z and 413Z serve as local driver pins. Input pins and receiver pins are essentially synonymous, and may be used interchangeably; the same is also true of output pins and driver pins.

Buffers and inverters may collectively be referred to as repeaters, while the other types of components are classified as non-repeaters. In an illustrative typical case, all connection paths of one skew group may have the same set of non-repeater components, and the paths of this skew group may differ only in their repeater cells. Each receiver pin is therefore situated downstream along a connection path from a first upstream driver pin, from which it is potentially separated only by an intervening set of one or more repeaters (if any). For example, receiver pin 407A, defining one of the inputs of AND gate 407, is connected to netlist driver pin 401 by an intervening connection path that includes two repeaters, i.e. buffer 403 and inverter 405, but that does not include any other driver pins or receiver pins. A receiver pin may therefore be said to be connected to a driver pin if the two are connected by a connection path that may include repeaters but does not include any non-repeaters or any intervening driver pins or receiver pins, in this illustrative example. If this connection path includes an odd number of inverters, the receiver pin is said to be inverter-connected (or simply I-connected) to the driver pin, while if the connection path includes an even number of inverters, the receiver pin is said to be buffer-connected (or simply B-connected) to the driver pin. Receiver pin 407A is therefore inverter-connected to driver pin 401, while receiver pin 413B is buffer-connected to driver pin 407Z.

Netlist 400 may be considered as a series of connection paths defined from each driver pin to its immediately subsequent receiver pin, as elementary connection path sections within the larger connection path of the netlist 400, each with a path segment, extending between a pair of pins, including a driver pin and an immediately subsequent receiver pin. The collected pairs of pins associated with the elementary connection path segments within netlist 400 may be considered as part of a set of pairs, labeled as the set CON. As part of finding pin correspondences as in step 303 of method 300, the set CON of pairs of pins may be divided into different classes of equivalence labeled $CON_1, CON_2, \ldots CON_N$, where N is the number of classes of equivalence. Two pairs from the set CON belong to the same class of equivalence if the connection path from the driver pin to the receiver pin of the first pair, and the connection path from the driver pin to the receiver pin of the second pair, are corresponding fragments of two connection paths of a skew group. Classes of equivalence for the existing pairs in netlist 400 may be provided by adding a second connection path to netlist 400, producing new netlist 500 as depicted in FIG. 5, thereby contributing to skew optimization, as further described below.

The new connection path section in netlist 500 is connected to the existing connection path segment at the node of output pin 403Z, and continues from that point to receiver pin 525, along the way also including AND gate 517, inverter 519, and OR gate 523. Netlist 500 therefore includes a skew group with two connection paths: a first connection path from input pin 401 to receiver pin 415, and a second connection path from driver pin 401 to receiver pin 525. The second connection path includes inverter 519 that corresponds to inverter 409, and also includes a number of non-repeater components that correspond to pre-existing non-repeater components on the first connection path: AND gate 517 corresponds to AND gate 407, OR gate 523 corresponds to OR gate 413, and output pin 525 corresponds to output pin 415. These corresponding pairs of components therefore facilitate the establishment of three classes of equivalence, i.e. the number N of classes of equivalence is labeled as N=3. These three classes of equivalence may be labeled $CON_1=\{(401, 407A), (401, 517A)\}$; $CON_2=\{(407Z, 413B), (517Z, 523B)\}$; and $CON_3=\{(413Z, 415), (523Z, 525)\}$, where each equivalence class is labeled by indicating each of its path segments with the reference labels of the driver pin and the receiver pin of one path segment within a pair of parentheses. In other words, the first class of equivalence $CON_1$ includes the equivalent path segments from 401 to 407A and from 401 to 517A, and so forth, where each class of equivalence includes corresponding path segments from each of the two connection paths, where each path segment is bounded by an output pin and the next input pin on a non-repeater component downstream of the output pin. On the other hand, if a netlist includes a class of equivalence with only one path segment, that path segment has no equivalent path segment on another connection path.

After step 303 of analyzing the connection paths and finding pin correspondences, method 300 for path equalization next includes step 305, of inserting splitters. Sometimes one class of equivalence $CON_k$ (k=1,2, . . . ,N) may contain both a buffer-connected path segment and an inverter-connected path segment, as is true of the equivalence classes $CON_1$ and $CON_2$, as further explained below. Such segments can be equalized by introducing a component known as a splitter, and using it to replace selected inverters in some cases, for example. A splitter is a component with one input A, and two outputs Z and NZ, such that Z=A and ZN=not(A), and the arcs A->Z and A->NZ internal to the splitter have similar signal propagation timing characteristics—ideally, as similar as possible. Because of the similarity in timing properties between an inverted output and a non-inverted output, a splitter can provide the effect of an inverter without counting as an inverter for purposes of evaluating whether a connection path is inverter-connected or buffer-connected. Inserting splitters at the appropriate positions of netlist 500 of FIG. 5 results in a further modified netlist shown as netlist 600 in FIG. 6.

Netlist 600 includes splitters 631, 633, and 643. Splitter 631 has replaced inverter 405 of netlist 500, and splitter 633 has replaced inverter 411 of netlist 500. Splitter 643 is introduced on the second connection path where there had been no component, at a position corresponding to that of splitter 633 on the first connection path. The connection path fragment leading to receiver pin 517A of AND gate 517 is also altered to begin at output pin 631Z of splitter 631m, rather than output pin 403Z of inverter 403 in netlist 500.

The splitters added in netlist 600 further address the classes of equivalence in netlist 500. In netlist 500, only the third equivalence class $CON_3$ has the same connectedness in both its path segments, i.e. they are both buffer-connected, while the other two equivalence classes $CON_1$ and $CON_2$ in netlist 500 each have one buffer-connected path segment and one inverter-connected path segment. A path segment is buffer-connected if it has an even number of inverters, including if it has zero inverters. The insertion of the splitters 631, 633, and 643 as provided in netlist 600, including the elimination of the inverters 405 and 411, modifies the equivalence classes of the netlist, including providing for all of the classes of equivalence to have both their path segments have the same connectedness, either both buffer-connected or both inverter-connected.

Specifically, with the insertion of the splitters 631, 633, and 643, netlist 600 has four equivalence classes, which may be labeled $CON_1=\{(631NZ, 407A), (631Z, 517A)\}$; $CON_2=\{(407Z, 633A), (517Z, 643A)\}$; $CON_3=\{(633NZ, 413B), (643Z, 523B)\}$; and $CON_4=\{(413Z, 415), (523Z, 525)\}$. The number of equivalence classes N is therefore equal to 4. Whereas netlist 500 of FIG. 5 had one class of equivalence that began at driver pin 401, the path segment that begins there now ends at splitter 631, forming only a single path segment within its class of correspondence, so it is no longer considered within the equivalence classes. Each of the four equivalence classes has both path segments either buffer-connected or inverter-connected. An equivalence class with only buffer-connected path segments may be referred to as B-class, while an equivalence class with only inverter-connected path segments may be referred to as I-class. In the case of netlist 600, $CON_1$, $CON_3$ and $CON_4$ are B-class, while $CON_2$ is I-class.

Referring once again back to path equalization method 300 of FIG. 3, after step 305 of inserting splitters, the next step is step 307, of building balanced buffer/inverter trees. All driver pins in a netlist may be divided into two classes of equivalence. Two driver pins (driver pin 1, driver pin 2) belong to one class of equivalence if there are 2 receiver pins (receiver pin 1, receiver pin 2) such that pairs (driver pin 1, receiver pin 1) and (driver pin 2, receiver pin 2) belong to one class of path segments $CON_k$. Considering only the driver pins in each of the four equivalence classes in FIG. 6, the pairs of driver pins in these equivalence classes are {631NZ, 631Z}, {407Z, 517Z}, {633NZ, 643Z}, and {413Z, 523Z}. The goal of building the balanced buffer/inverter trees is to build the corresponding trees of buffers and/or inverters connected to driver pins of one driver class such that the following four conditions are met:

1. These trees must have fanout of not more than a threshold value of fanout F.
2. The roots of these trees are driver pins of one class of drivers.
3. The leaves of these trees are all receiver pins connected to driver pins.

4. If two path segments (driver pin 1, receiver pin 1) and (driver pin 2, receiver pin 2) belong to one class $CON_k$, where k=1,2, ... N, then:

4a. Lists of buffers and inverters that are inserted between driver pin 1 and receiver pin 1, and between driver pin 2 and receiver pin 2, must be the same.

4b. Nets that lie on a path from driver pin 1 to receiver pin 1 and nets that lie on the path from driver pin 2 to receiver pin 2 must have the same fanouts.

The task of building balanced buffer/inverter trees becomes more complicated if some driver pins are connected to receiver pins of multiple number of classes $CON_k$. This is illustratively demonstrated in FIG. 7.

Figure 7:
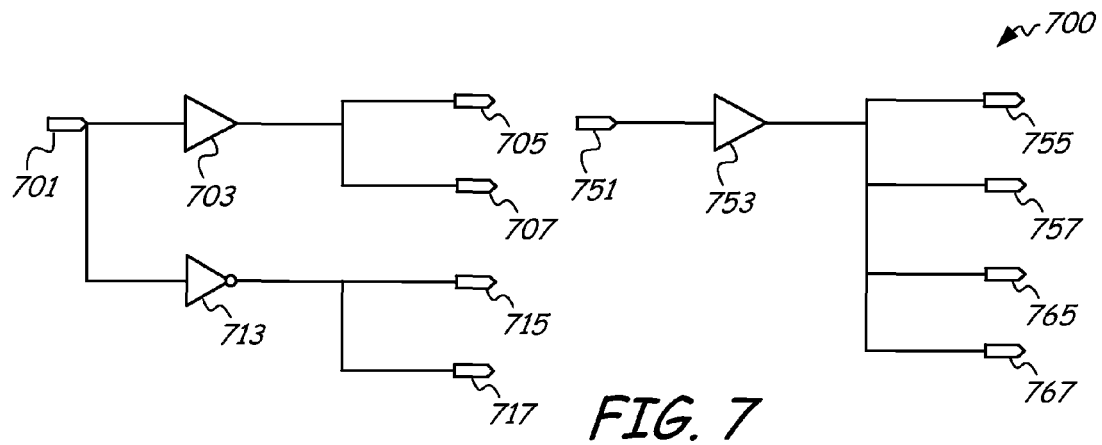
FIG. 7 depicts block diagrams for a set of connection paths involved in a path equalization process, according to one illustrative embodiment.

FIG. 7 depicts illustrative netlist 700, in a configuration prior to step 307 being performed, of building balanced buffer/inverter trees. Skew group 700 includes which includes two separate, corresponding connection paths stemming from driver pins 701 and 751, with the two connection paths still in the same skew group as each other. The first connection path includes buffer 703, inverter 713, and receiver pins 705, 707, 715, and 717, while the second connection path includes buffer 753, and receiver pins 755, 757, 765, and 767. Driver pins 701, 751 form one equivalence class, in this illustrative embodiment. Netlist 700 also has two equivalence classes, $CON_1$ and $CON_2$, for its path segments, where $CON_1=\{(701, 705), (701, 707), (751, 755), (751, 757), (751, 765), (751, 767)\}$, and $CON_2=\{(701, 715), (701, 717)\}$. The fanout F of netlist 700 is 2. Driver pin 701 is therefore connected to receiver pins of both classes of equivalence, $CON_1$ and $CON_2$, while driver pin 751 is only connected to path segments of the same equivalence class, $CON_1$, resulting in unbalanced buffer/inverter trees. This imbalance in the buffer/inverter trees are another example of skew-influencing features that do not correspond across connection paths of the netlist, and that are liable to cause signal timing skew. Netlist 700 may therefore be modified as shown in FIG. 8 to resolve this imbalance.

Figure 8:
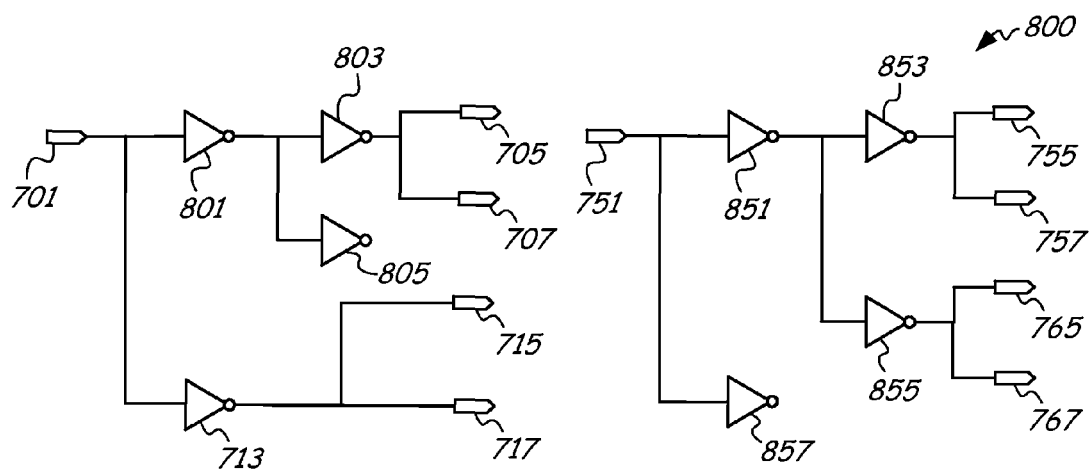
FIG. 8 depicts block diagrams for a set of connection paths involved in a path equalization process, according to one illustrative embodiment.
Figure 9:
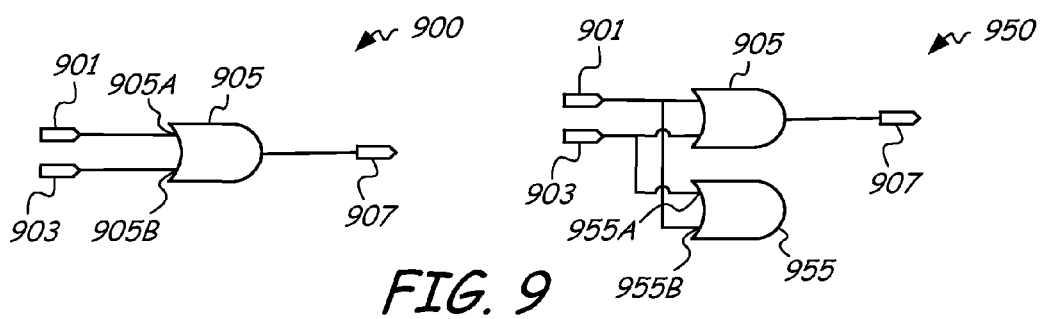
FIG. 9 depicts block diagrams for a set of connection paths involved in a path equalization process, according to one illustrative embodiment.

FIG. 8 depicts netlist 800, which is one illustrative example of a way to modify netlist 700 of FIG. 7 to establish balanced buffer/inverter trees in the corresponding connection paths, thereby correcting skew between the netlists. Netlist 800 includes the addition of inverters 801, 803, 805, 851, 853, 855, and 857, the removal of buffers 703 and 753, and certain modifications to the connection paths, as depicted. Netlist 800 also satisfies all four of the conditions listed above, for balancing corresponding trees of buffers and/or inverters. For each path segment between a driver pin and a receiver pin of class $CON_1$, the path from the driver pin to the receiver pin includes two inverters, and all nets of these paths have fanout F of 2. For each path segment between a driver pin and a receiver pin of class $CON_1$, the path from the driver pin to the receiver pin includes one inverter, and all nets of these paths also have fanout F of 2. Referring once more to path equalization method 300 of FIG. 3, the next step is step 309, of balancing the component pins. Sometimes driver pins or receiver pins of one class of equivalence $CON_k$, k=1,2, ... N, may be output pins or input pins of one component. An illustrative example of this is depicted in netlist 900 of FIG. 9. Netlist 900 includes two driver pins 901 and 903 leading to input pins 903A, 903B respectively of OR gate 903. OR gate 903 in turn leads to receiver pin 905. In netlist 900, the number of equivalence classes N equals 1, where that one equivalence class includes $CON_1=\{(901, 905A), (903, 905B)\}$. Notwithstanding the pins along the corresponding path segments being equivalent, they may have different skew-influencing characteristics, such as different capacitances or timing delays. One illustrative way to balance such pins includes to replace a component with unbalanced pins with a component that has the equivalent functionality and balanced pins. Another illustrative way of balancing such pins is to add a dummy component of the same type, to equalize the skew-influencing features, such as capacitances or timing delays, of the nets. An illustrative example of this is provided in the modified netlist 950 of FIG. 9, which constitutes a form of netlist 900 that has been modified to include a new OR gate 955, and to add new connection path segments from driver pin 901 to input pin 955B of OR gate 955, and, vice versa, from driver pin 903 to input pin 955A of OR gate 955. Therefore, after the addition of OR gate 955 and the new connections as shown, both connection path segments have equivalent sets of connected pins, and the component pins are balanced.

Finally, with step 309 of balancing the component pins, method 300 includes the step 311 of outputting the equalized, skew-corrected netlist. This may be in the form of a hardware description language specification, for example. This output can be stored on a computer readable medium, such as a volatile or non-volatile memory, transmitted through a communication network, and/or displayed to a user, for example. The output can include one or more data files, for example, which can have any suitable format or structure. The output may be further used for manufacturing an integrated circuit using a design derived at least in part from the skew-corrected netlist, for example.

Figure 10:
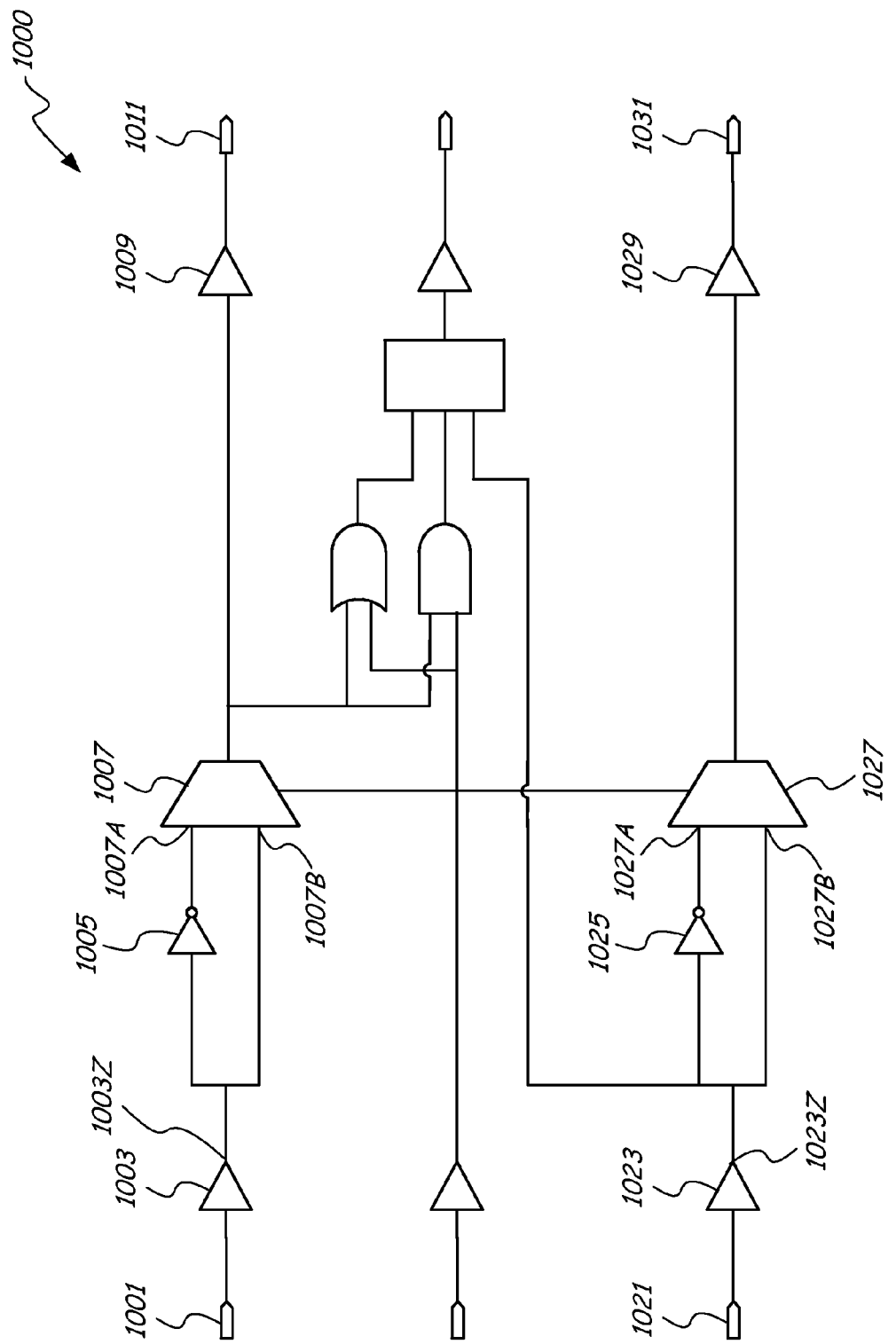
FIG. 10 depicts block diagrams for a set of connection paths involved in a path equalization process, according to one illustrative embodiment.
Figure 11:
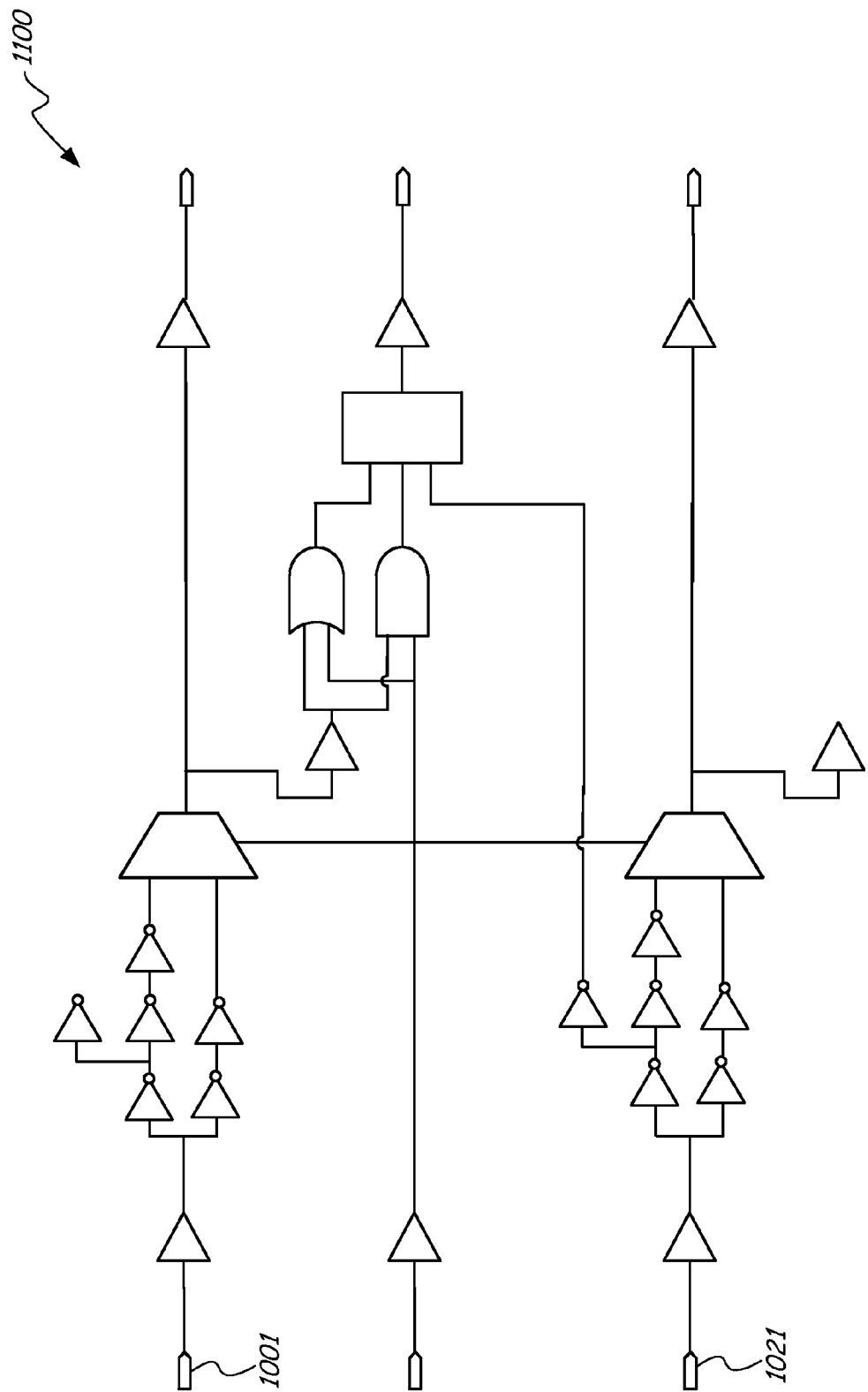
FIG. 11 depicts block diagrams for a set of connection paths involved in a path equalization process, according to one illustrative embodiment.

FIG. 10 shows another example of a netlist 1000, of a slightly larger scale, prior to path equalization, and FIG. 11 depicts netlist 1100 as an illustrative example of a modification of netlist 1000 following the steps of the path equalization method outlined above, according to an illustrative example.

In netlist 1000, there are two pairs of corresponding connection paths. One pair of corresponding connection paths includes a first connection path extending from driver pin 1001, to buffer 1003, to inverter 1005, to input pin 1007A of multiplexer 1007, to buffer 1009, to receiver pin 1011; and a second connection path from driver pin 1021, to buffer 1023, to inverter 1025, to input pin 1027A of multiplexer 1027, to buffer 1029, to receiver pin 1031. All of the path segments and components in each of these connection paths corresponds to a path segment or component in the other of these connection paths, in the same order. The second pair of corresponding connection paths includes a third connection path extending from driver pin 1001, to buffer 1003, to input pin 1007B of multiplexer 1007, to buffer 1009, to receiver pin 1011; and a fourth connection path from driver pin 1021, to buffer 1023, to input pin 1027B of multiplexer 1027, to buffer 1029, to receiver pin 1031. The first pair of connection paths therefore has different skew-influencing features than the second pair of connection paths, and may have a significant timing skew between them. Furthermore, the connection paths within each of these pairs also have different skew-influencing features; for example, they have different fanouts, i.e. they have different numbers of receiver pins connected to their driver pins, considered for example in terms of the output pins 1003Z, 1023Z of equivalent buffers 1003, 1023 in the respective connection paths in either of the pairs of corresponding connection paths. Output pin 1003Z in the first connection path has fanout 2, while output pin 1023Z in the second connection path has fanout 3. Likewise, the third and fourth connection paths also have different fanouts from each other, and therefore also have different skew-influencing features.

These differences in skew-influencing features within pairs of corresponding connection paths are resolved after a path equalization process as described above, which generates a modification of netlist 1000 that is depicted in FIG. 11 as netlist 1100. Both skew groups stemming from driver pins 1001, 1021 are now equivalent in netlist 1100, and both pairs of corresponding connection paths are now equivalent, with skew between the connection paths reduced or minimized, in modified, skew-corrected netlist 1100. Both components and nets that lie on the connection paths of one skew group are equivalent. The corresponding nets have the same driver pins, the same fanouts, and the same sets of receiver pins.

The steps shown in FIG. 3 and discussed with respect to FIGS. 4-11 can be implemented individually or collectively, manually or as part of a design tool, whether implemented as part of an operating system or specific application, database, component, program, object, module, or sequence of instructions, for example. Such a design tool or tools typically include one or more instructions or databases that are resident at various times in various memory and storage devices in or associated with a computing device, and that, when read and executed by one or more processors in a computing device and/or computer network, cause that computer or those computers to perform the instructions and/or access the databases embodying the various aspects of the present disclosure. Examples of computer readable media in which such instructions, databases and/or results of the process can be stored include but are not limited to recordable media such as volatile and non-volatile memory devices, floppy and other removable discs, hard disc drives, optical discs, e.g., CD-ROMs, DVDs, etc., among others.

Additional illustrative aspects of process 100 and method 200 may include a tool referred to as equivalent routing. Equivalent routing addresses differences in the path fragments between different connection paths that may influence skew. In equivalent routing, generating the skew-corrected netlist may further include re-routing two of the connection paths to have equivalent path fragments. In different illustrative examples, re-routing two of the connection paths to have equivalent path fragments may include: providing the same number of path fragments in the first connection path as in the second connection path; providing the path fragments with equal lengths in the first connection path as in the second connection path; providing the path fragments with the same orientations in the first connection path as in the second connection path; and providing the path fragments in the same substrate layer in the first connection path as in the second connection path, as different illustrative examples.

In an illustrative example, a circuit design may include any number N groups of nets, or connection paths, i.e. N>=1. A specific group of nets may be referred to as the i-th group of nets, which is said to contain $N_i$ nets, with (i=1,2, ... N), and $N_i$>=1. All nets of one group have one driver pin and the same number of receiver pins. Additional elements of this illustrative example may be labeled as follows: A number of receiver pins of nets of the i-th group are labeled R. A driver pin of the j-th net of the i-th group is labeled $DR_{ij}$ (i=1,2, ... N, j=1, 2, ... ,$N_1$). A k-th receiver pin of the j-th net of i-th group (i=1,2, ... ,$N_i$, j=1,2, ... ,$N_i$, k=1,2, ... ,$R_i$) is labeled $RC_{i,j,k}$. Receiver pins of the i-th group are split into $CL_i$ ($CL_i$<=$R_i$) classes of equivalence, such that k-th receiver pins $RC_{i,j,k}$ of all nets of the i-th group belong to the same equivalence class. This means that for pin $RC_{i,j,k}$ to belong to some class of equivalence does not depend on index j. Denote $C_{i,k}$ to be an index of the equivalence class to which pin $RC_{i,j,k}$ (j=1, 2, ... ,$N_i$) belongs. The process of equivalent routing includes routing nets of the given groups such that for each group (i-th group), all receiver pins of one class of equivalence have the equivalent routing. It means that for each $k_1$ and $k_2$ 1<=k1<k2<=$R_i$ such that $C_{i,k1}$=$C_{i,k2}$ and for each net number j=1,2, ... ,$N_i$ all the routing paths from driver pin $DR_{ij}$ to receiver pin $RC_{i,j,k1}$ and all the routing paths from driver pin $DR_{i,j}$ to receiver pin $RC_{i,j,k2}$ should have skew-influencing properties, such as resistances and capacitances, that are similar, and ideally the same, such that signal timing will also be the same or within a small margin of each other across the different nets.

In an illustrative example of a method of equivalent routing, the equivalent routing uses 2 layers, where all routing wires that lie on the first layer have a horizontal direction, and all routing wires that lie on the second layer have a vertical direction, or vice versa—which layer is labeled as which may be selected as an arbitrary convention in this example. The present illustrative example applies to routing of nets with fanouts 1 ($R_i=1$). It is equally applicable to equivalent routing of nets with fanouts higher than 1 ($R_i>1$), because these can also be reduced to equivalent configurations of routing several nets that each have a fanout of 1, as described further below. Each net of these groups has 1 receiver pin, so the lower index "k" may be disregarded and removed from the notation "$RC_{i,j,k}$". All receiver pins of all nets of one group belong to one class of equivalence.

In accordance with the present illustrative method, the equivalent routing of nets (or routing to correct or reduce differences in skew-influencing characteristics, such as the resistances and the capacitances of corresponding connection paths) is obtained as the result of modifying a netlist to pursue the following conditions: paths from driver pins to receiver pins that must have the equivalent routing consist of the same number of wires; the corresponding wires of these paths lie on the same layers and have the same lengths; and these wires are shielded by ground nets to prevent parasitic capacitances of neighboring wires. Connecting driver pins with receiver pins to match the first two of theses conditions is discussed further below, and the third condition of shielding is discussed subsequently.

The present illustrative embodiment includes grid-based routing. A rectilinear grid may be super-imposed on a routing region and the routing wires restricted to follow paths along the vertical and horizontal grid lines. The set of horizontal and vertical grid lines may be called a grid network. The intersection points of horizontal and vertical grid lines are called points of the grid network. Vertical and horizontal grid lines of the grid may be enumerated by integer numbers 0, 1, 2, etc.

Pursuing equivalent routing of the connection paths includes pursuing the following goals, in the present illustrative embodiment. The routing paths created by the equivalent routing method should have a reduced number of wires, ideally reduced to a minimum number possible, which in turn also leads to these paths have the minimal possible number of vias between layers. The routing created by the equivalent routing method should also use a concurrent approach, in which all net groups are routed simultaneously. This makes it possible to prevent situations when nets of one group that have already been routed block nets of another group that is yet to be routed. In the present illustrative embodiment, the method includes both the definition of the geometry of routing paths, and the algorithm of creating these routing paths.

Figure 12:
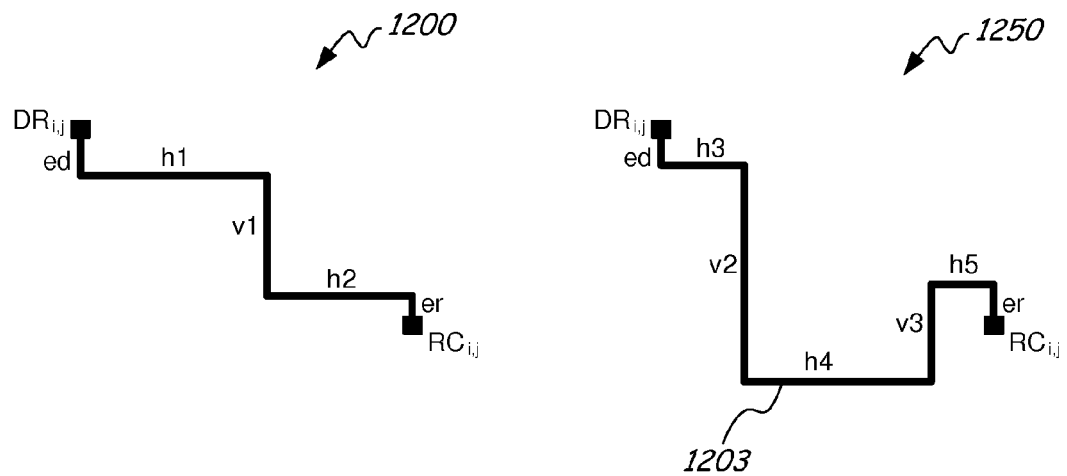
FIG. 12 depicts block diagrams for a set of connection paths involved in an equivalent routing process, according to one illustrative embodiment.

FIG. 12 illustrates an example regarding the geometry of routing. FIG. 12 depicts two types of shapes of the routing paths, for netlists 1200 and 1250. Nets of one group are being routed using geometry of the same type. The group of nets may be said to be of type 1 or of type 2, if nets of this group are routed by geometry of type 1 or of type 2, correspondingly. Type 1 and type 2 routing are further explained below. The routing of type 1 is simpler than the routing of type 2 in this example, so this illustrative method may include first attempting to route all groups by type 1, and then resorting to routing by type 2 for remaining nets as needed, due to blockages. Any nets not susceptible to routing by type 1 should be identified after the first attempts at routing the list of net groups.

Routing of type 1 is illustrated in netlist 1200 of FIG. 12. Routing of type 1 involves 5 wires. Vertical wires ed and er that are connected to driver pin $DR_{ij}$ and receiver pin $RC_{ij}$ correspondingly are special wires known as extension wires that have a very small length, in the present illustrative embodiment. The smaller the extension wires are, the more difficult it is for the equivalent routing algorithm to route the nets successfully, but the better the quality of the equivalent routing. Usually the maximal length of an extension wire is several tens of grids. The algorithm of the equivalent routing in the present illustrative embodiment does not depend on the equalization of length of extension wires for all nets of one group. Rather, the algorithm of the present illustrative embodiment seeks to minimize the lengths of extension wires.

The routing of type 1 in netlist 1200 of FIG. 12 also has 3 wires besides the two extension wires: two horizontal wires, labeled $h_1$ and $h_2$, and one vertical wire, labeled $v_1$. These three wires have equalized lengths for all nets of one net group. This means that the lengths of wires $h_1$ (or $h_2$, or $v_1$) of all nets of one group must be the same. Further discussion is provided below regarding how the lengths of these wires are equalized for the different nets of one group.

As depicted for netlist 1250 in FIG. 12, routing of type 2 also has driver and receiver vertical extension wires ed and er, as well as five other wires having equalized lengths: horizontal wires $h_3$, $h_4$ and $h_5$, and vertical wires $v_2$ and $v_3$. One goal of the method is to equalize the lengths of wires $v_1$-$v_3$ and $h_1$-$h_5$ of the nets of one group. This involves providing a way to equalize the lengths of a number N of vertical wires, while equalization of horizontal wires can be done in the same way.

Figure 13:
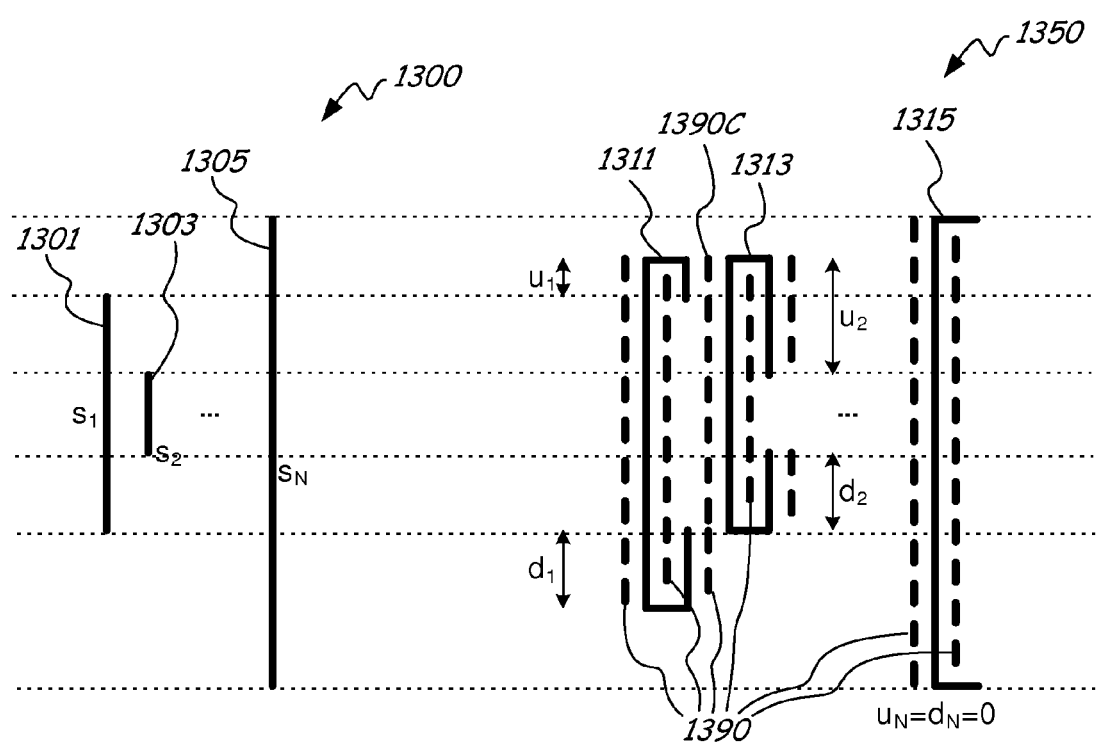
FIG. 13 depicts block diagrams for a set of connection paths involved in an equivalent routing process, according to one illustrative embodiment.

As depicted in FIG. 13, the lengths of non-equalized connection paths, i.e. wires in this illustrative embodiment, of the group 1300 are $s_1, s_2, \ldots s_N$. Let the maximal length of these wires be s. Then, the original wires $s_1, s_2, s_N$ are replaced with the group 1350 of wires having more complicated shapes, where connection paths 1311, 1313, and 1315 are modified versions of connection paths 1301, 1303, 1305, respectively, from group 1300. The lengths $u_1, u_2, u_N$ of the upper extensions of the wires of group 1350, and lengths $d_1, d_2, d_N$ of the lower extensions of the wires of group 1350, match the equation $u_i+d_i=(s-s_i)/2$, where $i=1,2,\ldots,N$. As depicted in FIG. 13, the wires of group 1350 have the same length as those they modify from group 1300, while they are merely folded in different arrangements. The wires in group 1350 are able to substitute for the wires in group 1300 to provide the same connection paths, but with equalized lengths.

Shielding wires 1390, depicted in FIG. 13 in dotted lines, surround the wires in group 1350. The shielding wires are ground wires that are added to protect the signal wires from skew-influencing features such as parasitic capacitances of neighbor wires, and are further discussed below.

This equalization process may be provided for wires $v_1$ through $v_3$ and $h_1$ through $h_5$, while pin extension wires ed and ec do not require the equalization. Equalized wires occupy whole channels that consist of five neighbor grids. Three of the five grids of these channels (the first, third and fifth) are occupied by shielding wires, as shown around the wires in group 1350. The other two of the five grids of these channels (the second and fourth) are occupied by equalized (extended) signal wires. Two neighbor channels may have a common shielding wires placed on the first or fifth grids. For example, for group 1350, the wire 1311 and the wire 1313 share a common shielding wire 1390C. This shielding wire lies on the fifth grid of the channel of wire 1311 and it lies on the first grid of the channel of wire 1313.

Figure 14:
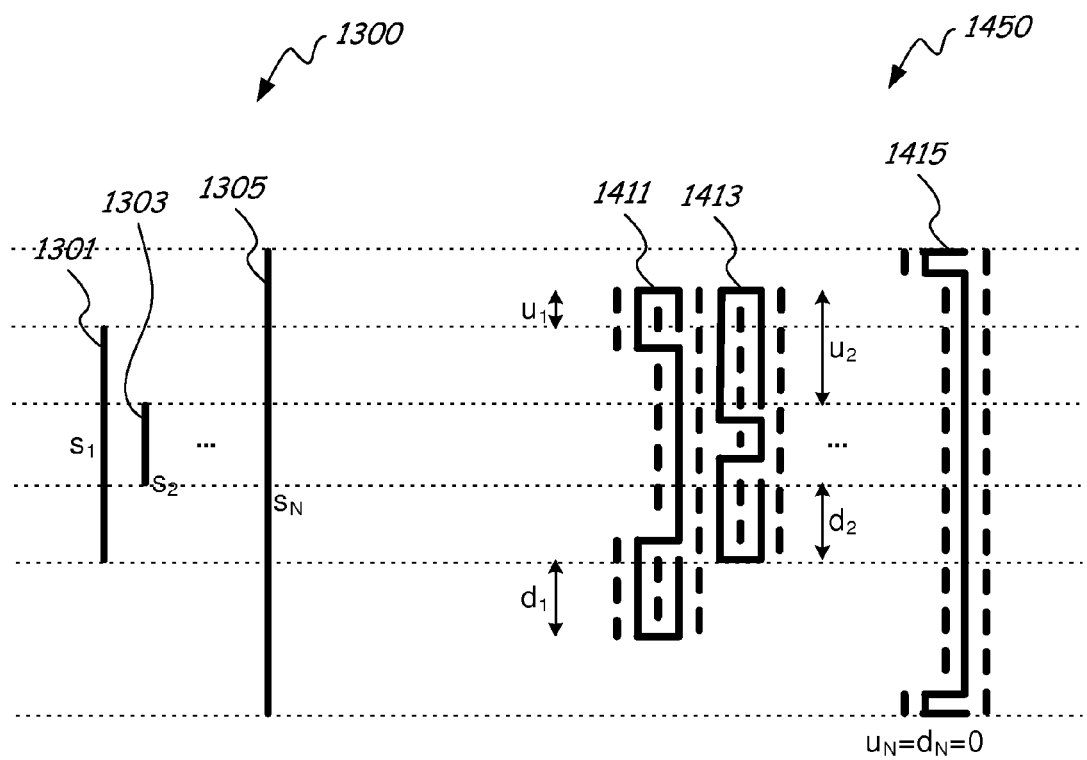
FIG. 14 depicts block diagrams for a set of connection paths involved in an equivalent routing process, according to one illustrative embodiment.
Figure 15:
FIG. 15 depicts block diagrams for a set of connection paths involved in an equivalent routing process, according to one illustrative embodiment.

Another illustrative example of equalizing connection path lengths is shown in FIG. 14. FIG. 14 also shows group 1300 of connection paths 1301, 1303, 1305, along with a different illustrative modification of those groups, as shown in group 1450, in which connection paths 1411, 1413, and 1415 are the respective modifications of the paths in group 1300. The equalized (extended) connection paths shown in modified group 1450 in FIG. 14 have more complex modified morphologies in comparison with the morphologies of the modified connection paths of group 1350 in FIG. 13. The advantage of the approach to path extension in group 1450 is that this approach makes it possible to use one common channel for two paths if these paths are extended to the different sides. This is depicted in FIG. 15. in which one wire 1511 is extended to the left side, while the second wire 1513 is extended to the right side.

Figure 16:
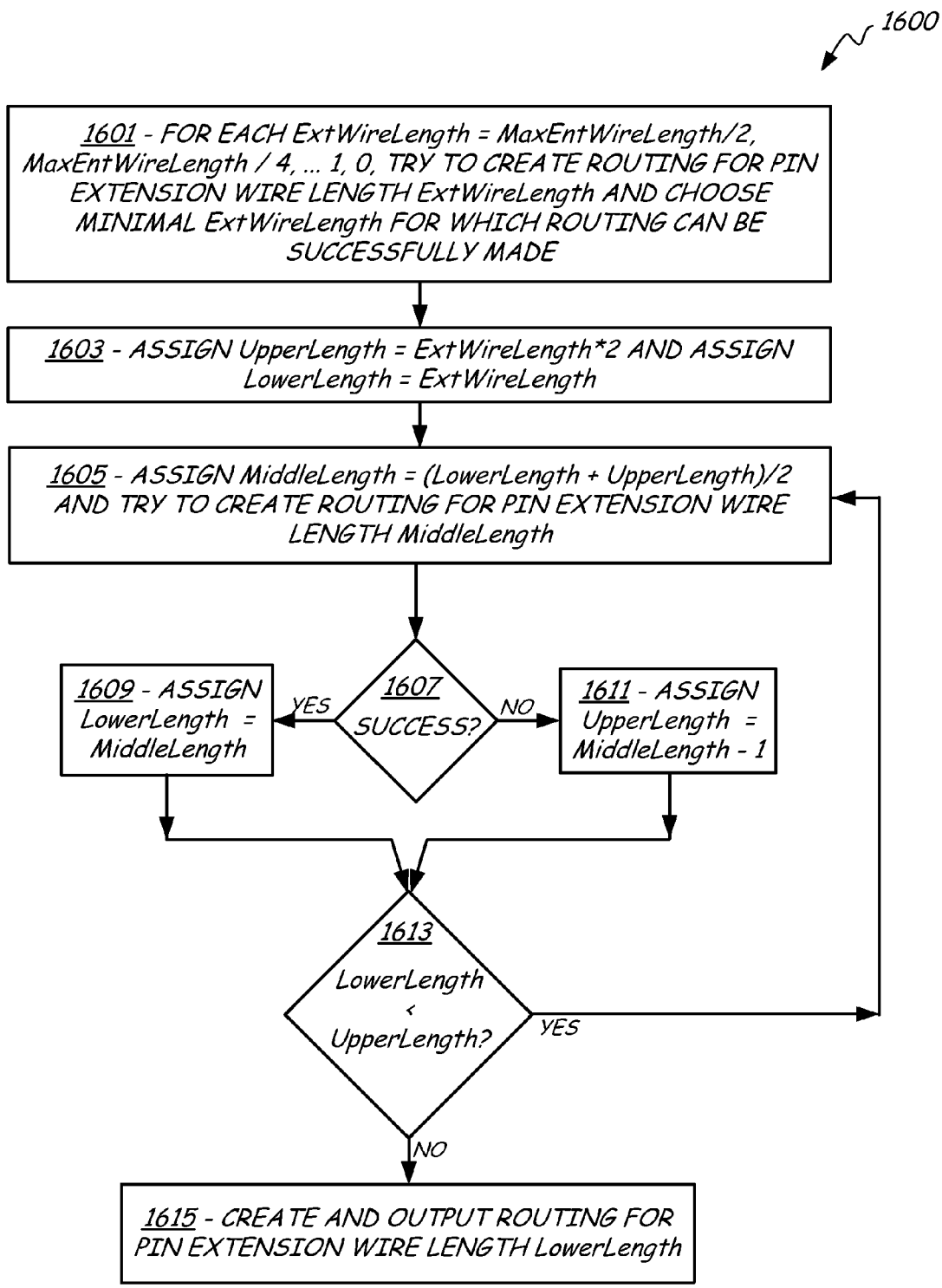
FIG. 16 depicts a flowchart for a an equivalent routing process, according to one illustrative embodiment.

Methods for equalizing the connection path lengths may also use a routing algorithm, an illustrative example of which is depicted as algorithm 1600 of FIG. 16. Algorithm 1600 may be implemented in any applicable software or computing environment, circuitry implementation, combination of the above, or other embodiment, in different implementations. The goal of a routing algorithm is to create an equivalent routing with reduced or minimized lengths of wires that extend pins, or pin extension wires ed and er, as in the illustrative example above. There is an upper bound on the allowed length of extension wires. This upper bound, which can be labeled MaxExtWireLength, is usually chosen to make skew-influencing features of extension wires, such as their capacitances and resistances, very small in comparison with the corresponding skew-influencing features of the pins that are extended by these wires. The upper bound MaxExtWireLength depends on the technologies involved in the particular implementation, and may illustratively be in the range of tens of grids, in the present illustrative example.

Referring to the routing algorithm 1600 as depicted in FIG. 16, the first step performed is step 1601, wherein the various optional extension wire lengths, labeled ExtWireLength, are examined from a series of options defined as MaxExtWireLength/2, MaxExtWireLength/4, . . . , 1, 0. An equivalent routing is attempted for each of these lengths (or for a subset of these lengths). The minimal ExtWireLength for which the routing gives the best results is selected.

Once the minimal compatible extension wire length ExtWireLength is selected according to step 1601, the next steps involve seeking the minimal wire extension length between ExtWireLength and (2* ExtWireLength) using a binary partition algorithm to find the optimized length of extension wires. This includes step 1603, of assigning UpperLength=ExtWireLength*2 and assigning LowerLength=ExtWireLength, and step 1605 of assigning MiddleLength=(LowerLength+UpperLength)/2 and trying to create an outing for pin extension wire length MiddleLength, and evaluating whether this succeeds, as at decision step 1607. If it does succeed, step 1609 follows, of assigning LowerLength=MiddleLength, while if it does not succeed, step 1611 is then taken, of assigning UpperLength=MiddleLength −1. The next step 1613 is to evaluate whether LowerLength<UpperLength. If it is, the process returns to step 1605, while if it is not, the method proceeds to step 1615, to create and output routing for pin extension wire length LowerLength.

Figure 17:
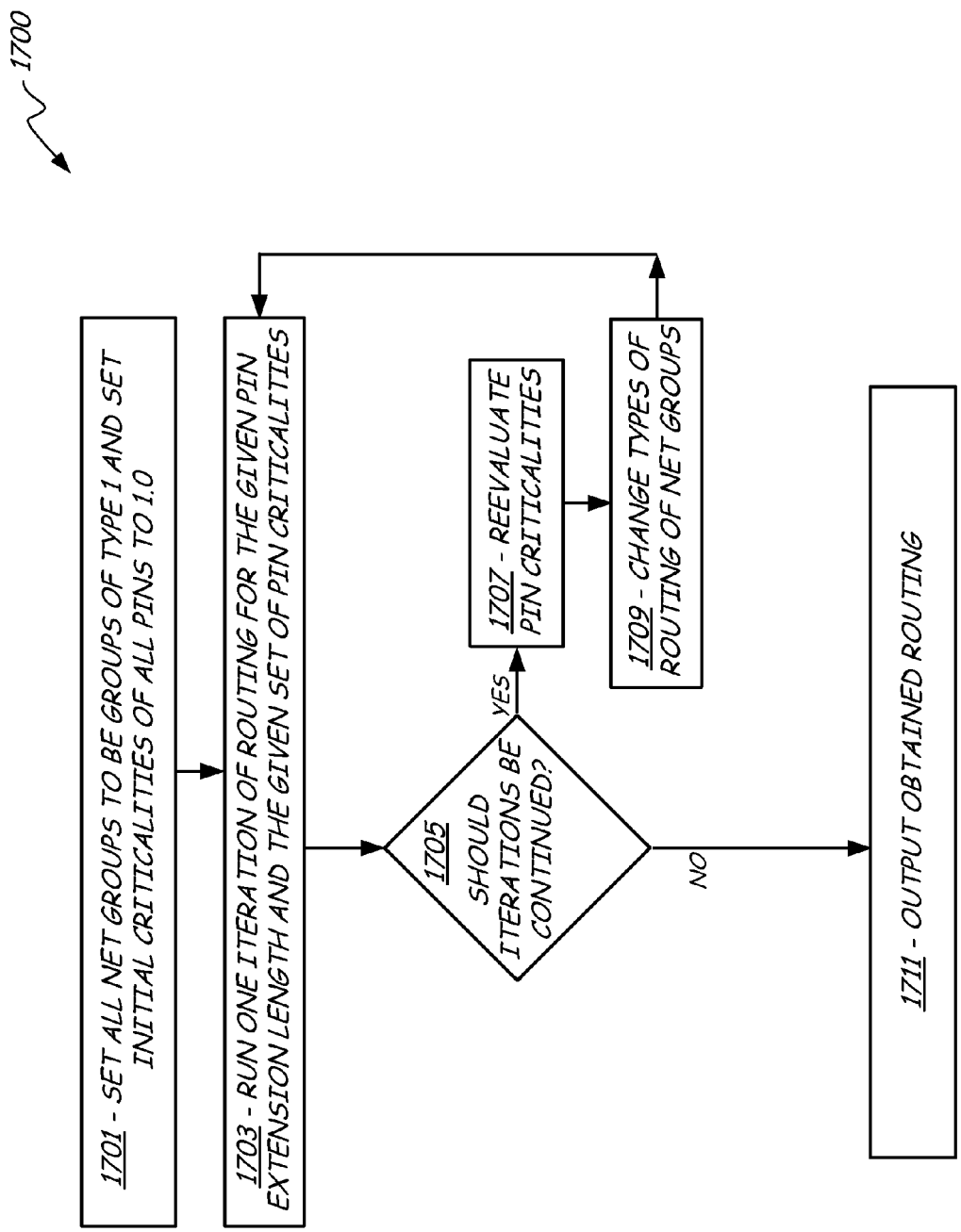
FIG. 17 depicts a flowchart for a an equivalent routing process, according to one illustrative embodiment.

FIG. 17 provides another algorithm 1700, this one for routing a given extension wire length, labeled ExtWireLength. Algorithm 1700 may be iterated, either a fixed number of times, or with a decision to stop the iterative process once a condition defined by a set of rules is met, for example. Even if a suitable routing is obtained in the result of some iteration, the iterations of algorithm 1700 may be continued in order to obtained a superior routing. A routing is evaluated to be superior by satisfying conditions such as maximizing the number of groups of nets that are successfully routed, that minimizes the length of the routing paths, and that minimizes crosstalk between connection paths, among other potential optimization conditions. Each of these conditions may be accorded different weights of importance in optimization decisions, as deemed appropriate in different embodiments.

Routing algorithm 1700 deals with the criticalities of pins. Pin criticality is some value that is assigned to a pin. The more pin criticality, the worse chance of successful routing of the net connected to this pin. Initially, in step 1701 of algorithm 1700, all net groups are set to be groups of type 1 and the initial criticalities of all pins are set to be the same and equal to 1.0. Next, step 1703 involves running one iteration of routing for the given pin extension length and the given set of pin criticalities. Step 1705 involves evaluating whether iterations should be continued; if yes, after each of the iterations, the criticalities of the pins are reevaluated, as in step 1707. If routing of some nets has failed, then criticalities of pins connected to these nets may be increased. Criticalities can be also increased even for pins that are connected to nets that were successfully routed, but blocked one or more failed nets. Criticalities of pins can be decreased for pins of those nets that were successfully routed and made no problems for routing other nets.

Initially all net groups may be routed by type 1. After each of the iterations, the decision to change the type of routing may be made, as in step 1709. The more criticality of pins connected to nets of some group, the better chance for this group to become a group of type 2, i.e. to become a group that is routed by type 2. And vice versa, the less criticality of pins connected to nets of some group, the better chance for this group to be a group of type 1.

After step 1709 of changing the types of routing of the net groups, algorithm 1700 returns to step 1703. When the conditions for ceasing the iterations are met, algorithm 1700 concludes with step 1711, to output the routing obtained by the earlier steps.

Figure 18:
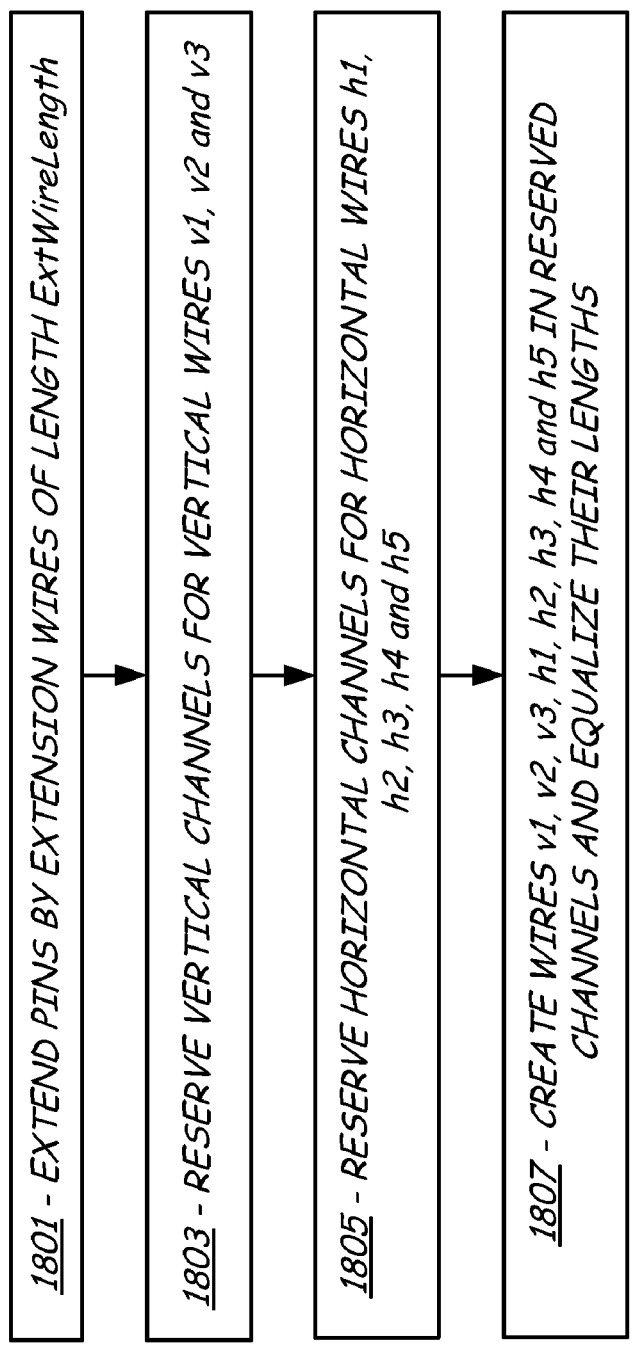
FIG. 18 depicts a flowchart for a an equivalent routing process, according to one illustrative embodiment.

FIG. 18 provides another routing algorithm 1800, for a given extension wire length ExtWireLength, and a given set of pin criticalities. Algorithm 1800 may be done in one iteration, and may be used as a single iteration of step 1703 of algorithm 1700 in FIG. 17, in one illustrative embodiment.

Figure 19:
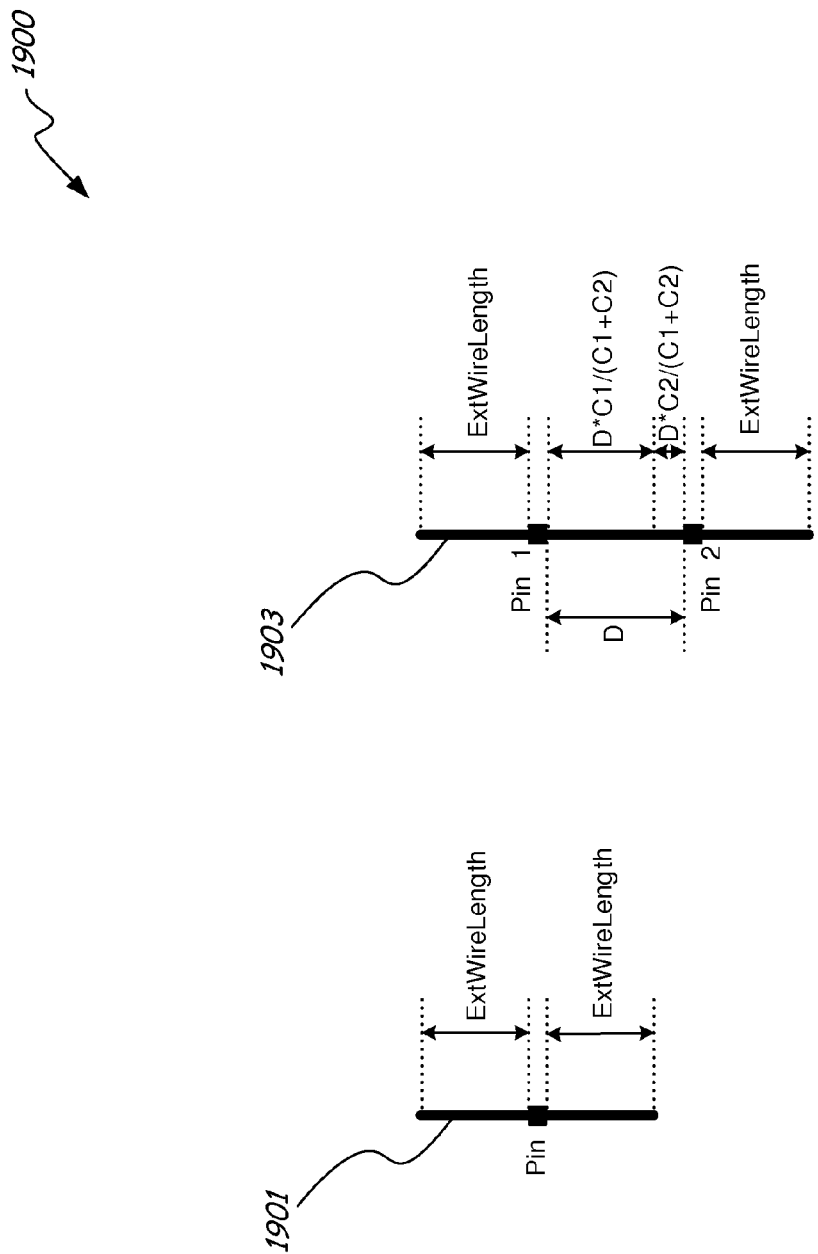
FIG. 19 depicts block diagrams for a set of connection paths involved in an equivalent routing process, according to one illustrative embodiment.

Algorithm 1800 begins with step 1801, of extending the pins by extension wires of length ExtWireLength. At this step of pin extension, vertical wires ed and er are provided, connected to driver and receiver pins. All these extension wires have length ExtWireLength, as depicted for path 1901 in FIG. 19, except a case when 2 pins are placed on one vertical grid and the distance D between 2 pins is less than 2*ExtWireLength, in the present illustrative embodiment. If this happens, the lengths of extension wires become less than ExtWireLength and these lengths are proportional to criticalities $C_1$ and $C_2$ of two pins, as depicted for path 1903 in FIG. 19. Thus lengths of extension wires are $D*C_1/(C_1+C_2)$ and $D*C_2/(C_1+C_2)$, in this illustrative embodiment.

Step 1803 is then performed, for reserving vertical channels for vertical wires $v_1$, $v_2$, and $v_3$. A vertical channel is a group of 5 neighbor vertical grids that can be used to create equalized vertical wires. For each net of a group of type 1, one channel is reserved for vertical wire $v_1$. For each net of a group of type 2, two channels are reserved for vertical wires $v_2$ and $v_3$, as in FIG. 12. Reserving vertical channels requires the following conditions that are to be matched, in the present illustrative embodiment:

1. All vertical channels may not have intersections, except in two cases: if two channels have a common first/fifth grid for shielding wires, or if two wires share a common channel as in FIG. 15.

2. For vertical channels assigned to wires $v_1$ and/or $v_2$ there must exists a horizontal channel that connects pin $DR_{i,j}$ or its extension wires with the vertical channel; this horizontal channel will be used for creating horizontal wires $h_1$ and/or $h_3$ correspondingly. The more such horizontal channels exist, the better, in this illustrative embodiment, especially if pin $DR_{i,j}$ has a large criticality. If the pin $DR_{i,j}$ has a large criticality, the reserved vertical channel should be close to pin $DR_{i,j}$, ideally as close as possible.

3. For vertical channels assigned to wires $v_1$ and/or $v_3$ there should exists a horizontal channel that connects pin $RC_{i,j}$ or its extension wires with the vertical channel; this horizontal channel will be used for creating horizontal wires $h_2$ and/or $h_5$ correspondingly. The more such horizontal channels exist, the better, especially if pin $RC_{i,j}$ has a large criticality. If the pin $RC_{i,j}$ has a large criticality, the reserved vertical channel should be close to pin $RC_{i,j}$, ideally as close as possible.

4. For each pair of vertical channels assigned to wires $v_2$ and $v_3$ belonging to one net, there should exist a horizontal channel that connects these two vertical channels; this horizontal channel will be used for creating horizontal wire $h_4$. The more such horizontal channels exist, the better.

5. All vertical channels assigned to wires $v_1$ of the nets of one net group, or assigned to wires $v_2$ of the nets of one net group, or assigned to wires v3 of the nets of one net group, must have the ability to be extended for equalization of the corresponding vertical wires $v_1$, $v_2$ or $v_3$. If these channels have lengths $s_1, s_2, \ldots s_N$ and the maximal of these lengths is less than the i-th channel (i=1,2, . . . ,N), they must have some reserved space for downward or upward extension by $(s-s_i)/2$ grids, in this illustrative embodiment.

After step 1803, step 1805 is performed, of reserving horizontal channels for horizontal wires $h_1$, $h_2$, $h_3$, $h_4$, and $h_5$. Horizontal channels are a group of five neighboring horizontal grids that can be used to create equalized horizontal wires. For each net of group of type 1, two channels should be reserved for horizontal wires $h_1$ and $h_2$. For each net of group of type 2, three channels should be reserved for horizontal wires $h_3$, $h_4$ and $h_5$, as in FIG. 12. The existence of at least one way of reserving the horizontal channels is guaranteed by the second, third, and fourth conditions listed above for reserving vertical channels. The more ways of choosing horizontal channels that are available, the higher the capacity to resolve conflicts between reserving horizontal channels of the different nets. The success or lack thereof of reserving horizontal channels therefore depends highly on how the reserving vertical channels was done. reserving the horizontal channels requires meeting the following two conditions:

1. All horizontal channels may not have intersections except two cases, i.e. if two channels have a common first/fifth grid for shielding wires, or if two wires share a common channel, as in FIG. 15.

2. All vertical channels assigned to wires $h_1$ (t=1,2,3,4,5) of nets of one net group must have the ability to be extended for equalization of the corresponding vertical wires $h_t$. If these channels have lengths $s_1$, $s_2$, $s_N$ and the maximal of these lengths is less than the i-th channel (i=1,2, . . . ,N), they must have some reserved space for leftward or rightward extension by $(s-s_i)/2$ grids, in this illustrative embodiment.

Finally, algorithm 1800 includes step 1807, of creating equalized vertical wires $v_1$-$v_3$ and equalized horizontal wires $h_1$-$h_5$ in reserved channels. The success of this final step 1807 is assured if the conditions 1 through 5 of reserving vertical channels and the conditions 1 and 2 of reserving horizontal wires are satisfied, in this illustrative embodiment.

Figure 20:
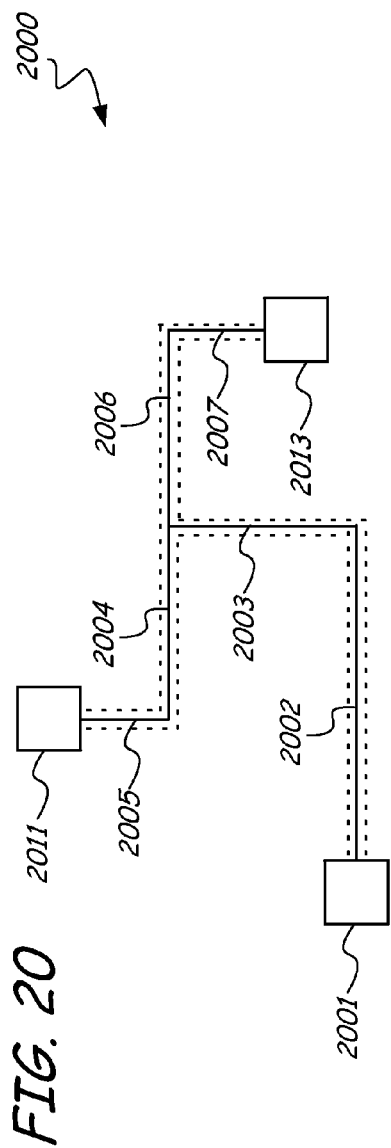
FIG. 20 depicts block diagrams for a set of connection paths involved in an equivalent routing process, according to one illustrative embodiment.
Figure 21:
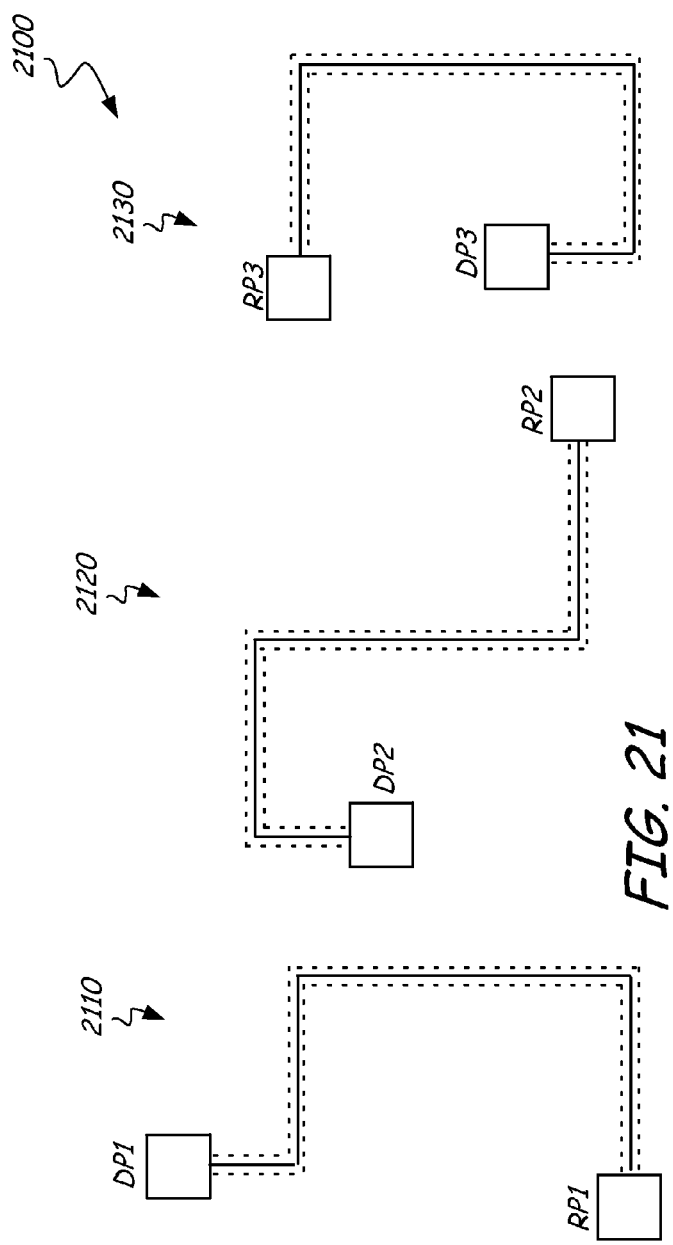
FIG. 21 depicts block diagrams for a set of connection paths involved in an equivalent routing process, according to one illustrative embodiment.

FIGS. 20 and 21 depict additional examples of netlists that have been modified by an equivalent routing process such as those described above. FIG. 20 depicts netlist 2000 with one net that has a fanout of 2. Netlist 2000 includes a driver pin 2001, connection path segments 2002 through 2007, and receiver pins 2011, 2013. The connection path segments are shielded, as depicted in dashed lines surrounding them; the shielding is further discussed below. The geometry of the routing from driver pin 2001 to receiver pin 2011 and from driver pin 2001 to receiver pin 2013 are equivalent. These two connection routes follow the arc of connection path segments 2001-2002-2003-2004 and 2001-2002-2005-2006, respectively, where each path segment in each line is either identical, or has the same length, and the same orientation (either horizontal or vertical) as the corresponding path segment in the other connection path, thereby reducing or minimizing skew-influencing features that might otherwise be associated with non-equivalent connection paths.

Similarly, FIG. 21 depicts netlist 2100, which includes three nets 2110, 2120, 2130, each of fanout 1, and each equivalent to each other. That is, each of these three nets includes the same number of connection path segments, and each connection path segment has one corresponding connection path segment of the same length, and the same orientation, either horizontal or vertical, and on the same layer, in each of the other two nets. Each of the three nets therefore has reduced or minimized or corrected skew-influencing features among them, so that they have equivalent features that influence signal timing, such as resistances, capacitances, and signal timing delays.

FIGS. 22-26 provide a closer description of providing grounded shielding wires adjacent to at least a portion of the connection paths, according to another illustrative embodiment involved in reducing skew-influencing features across the connection paths of a netlist, which may be combined with other involved techniques including equivalent routing, path equalization, and enhanced timing closure, for example. Providing grounded shielding wires adjacent to the connection paths contributes to reducing skew-influencing features of the netlist, including by inhibiting the appearance of parasitic capacitances of neighboring connection paths.

A netlist, embodying a circuit design, for example, may have a large number of groups of equivalent nets. Each group of nets may have a multiple number of nets. As far as nets of one group have an equivalent routing (satisfying conditions 1 and 2, as described above), these nets have much longer routing paths than they have in the case of the regular routing. Grounded wires may be added to shield these paths. The shielding ground wires may surround the original connection paths, e.g. signal wires in an illustrative embodiment, from different sides. It may be advantageous in some embodiments to add several neighboring shielding wires having the same length as the original signal wire, adjacent to that original signal wire.

Figure 22:
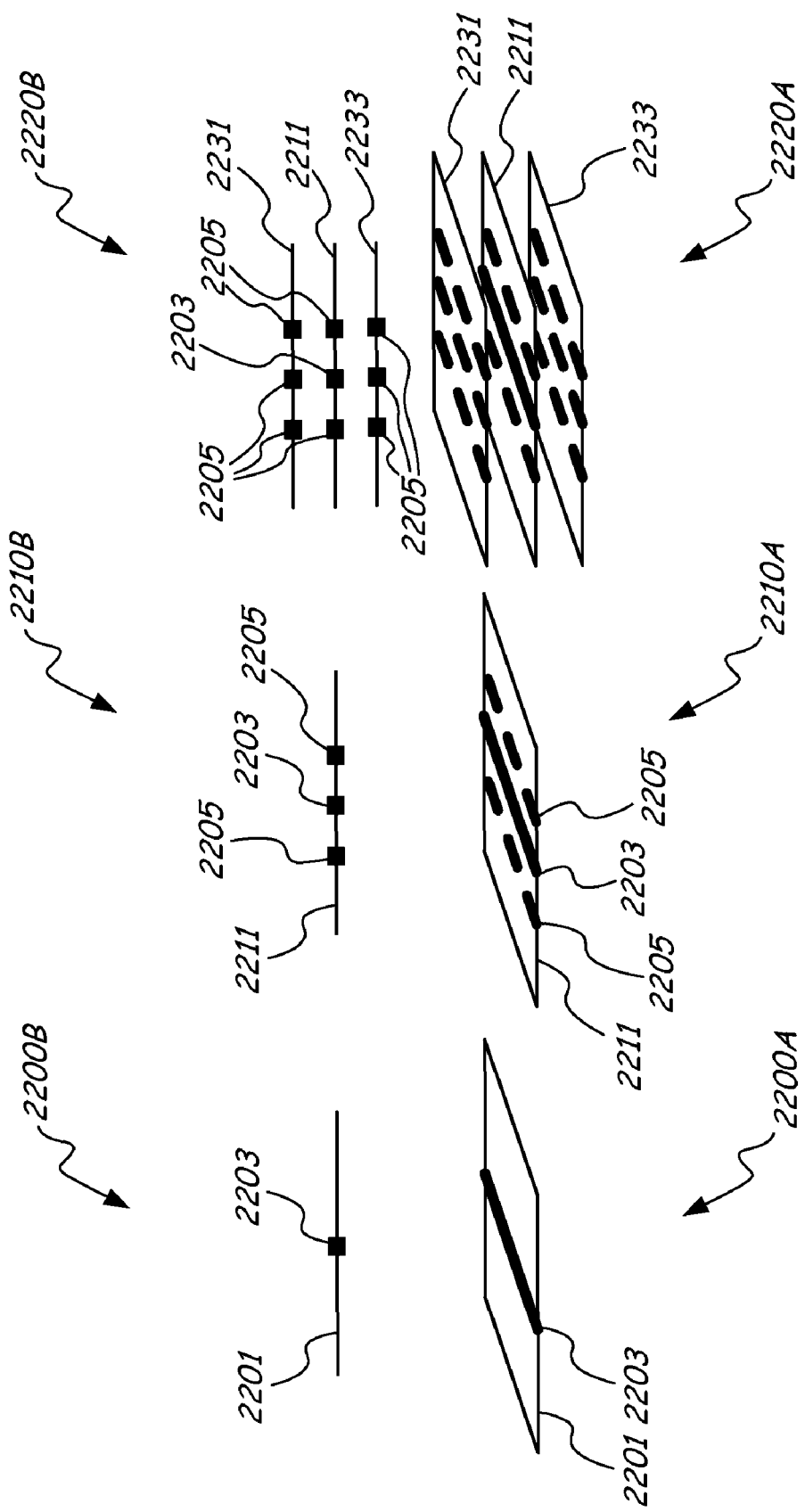
FIG. 22 depicts block diagrams for a set of connection paths involved in an equivalent routing shielding process, according to one illustrative embodiment.

FIG. 22 depicts grounded shielding wires provided adjacent to a signal wire connection path. Specifically, layer 2201 has a signal wire 2203 alone, depicted both in perspective view at 2200A and in side plan view at 2200B. Layer 2211 includes signal wire 2203 with grounded shielding wires 2205 disposed adjacent to it on either side, on layer 2211, as shown again both in perspective view at 2210A and in side plan view at 2210B. At 2220A and 2220B (in perspective view and side plan view, respectively), layer 2211 is depicted again, this time also surrounded by additional layers 2231 and 2233, where layer 2211 again includes signal wire 2203 with grounded shielding wires 2205 disposed adjacent to it on either side, and layers 2231 and 2233 both include three additional grounded shielding wires 2205, disposed adjacent to the connection path of signal wire 2203 across the layers. Signal wire 2203 therefore is largely surrounded by eight grounded shielding wires 2205, both on its own layer 2211 and on adjacent layers 2231, 2233, in this illustrative example, and is thereby very effectively electrically shielded, and unlikely to present significant skew-influencing effects on surrounding signal connection paths, such as by crosstalk or parasitic capacitance. A wide variety of other shielding arrangements and morphologies may also be used in many other embodiments, with a variety of numbers of shielding wires or other shielding elements fully or partly surrounding selected portions of signal connection paths, which may also provide effective signal shielding as appropriate for those embodiments.

The number of shield wires and the total length of shield wires may become very large in some embodiments. One problem that may arise at this stage is to connect all shield wires to ground pins of the netlist. A given netlist may have multiple ground pins. Shielding methods provided by the present disclosure may include methods of connecting multiple shielding wires to ground pins in preselected arrangements. This may be a significant aspect of a shielding method embodiment given the potentially very large number of grounded shielding wires desireable in some embodiments. Selecting a design for the grounded shielding may be guided by the criterion of making the required connections affect as small a routing area of the design as possible. This problem becomes ever more significant with larger netlists because connecting shield wires to ground pins is performed after all signal wires of the design are routed, so that the area available for creation of the shielding connecting wires is significantly constrained.

Another aspect of the connecting of the shielding wires to ground pins is memory usage. A netlist may have linear dimensions on the order of several tens of thousands of grids. Thus, the grid network of the netlist may contain billions of points. This makes it infeasible to use algorithms that require time and/or memory that is proportional to the number of points of the grid network of the netlist.

Figure 23:
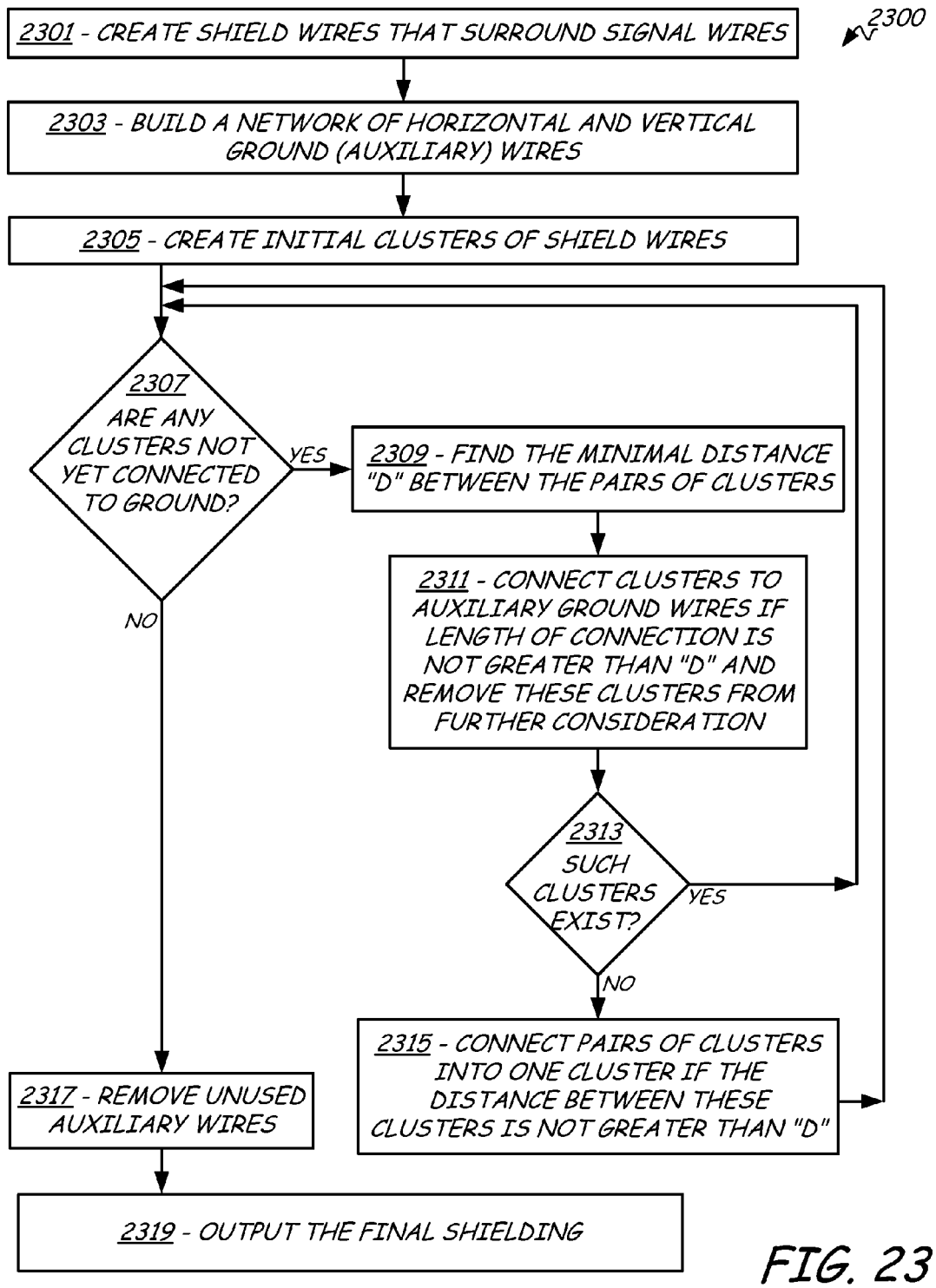
FIG. 23 depicts a flowchart for a an equivalent routing shielding process, according to one illustrative embodiment.

An illustrative embodiment of a method for providing grounded shielding wires for a netlist is provided as algorithm 2300 in FIG. 23. Algorithm 2300 begins with step 2301, of creating shielding wires that surround signal wires, as illustratively depicted in FIG. 22, as described above. Algorithm 2300 continues with step 2303, of building a network of horizontal and vertical auxiliary ground wires; these facilitate significantly reducing the time and memory that is needed for connecting shield wires to ground pins. This step may be helpful especially in cases where the ground pins are non-uniformly distributed over the design.

One illustrative example of a netlist design with non-uniform distribution of ground pins is depicted in FIG. 24 as netlist 2400, which includes ground pins 2401, 2403, 2405, where the ground pins extend in a plane-perpendicular direction, and are depicted in cross-section. FIG. 24 also depicts netlist 2410, in which the netlist is divided into a group of rectilinear regions, some of which may contain shielding wires and some which may not. Netlist 2420 indicates the rectilinear regions 2421, 2423 within the netlist that contain shielding wires, where the individual shielding wires within the regions 2421, 2423 are not individually depicted, due to scale. Netlist 2430 indicates the same netlist after being modified by performing step 2303, in which a network of horizontal and vertical auxiliary grounded shielding wires 2431 are provided, in conductive connection with the ground pins 2401, 2403, 2405, within regions 2421, 2423 that contain the original shielding wires. Those original shielding wires in regions 2421, 2423 may therefore be connected via the newly added auxiliary shielding wires 2431, to ground pins 2401, 2403, 2405, to provide for the shielding wires to be grounded.

The newly added auxiliary shielding wires 2431 are provided in such a way to follow the conditions that they intersect the selected regions 2421, 2423 that contain the original shielding wires, or otherwise provide the capability of connecting a shielding wire with at least one of the ground pins 2401, 2403, 2405. One of the selected regions 2421, 2423, which may each contain many shielding wires, may also include several of the auxiliary shielding wires 2431. Dealing with the individual shielding wires within one of the selected regions is considered next.

The shielding wires that belong to one of the selected regions 2421, 2423 may be grouped into initial clusters, as in step 2305 of algorithm 2300. In an illustrative embodiment, two shielding wires are grouped in one cluster if and only if one of two conditions are met: first, if these wires "intersect", i.e. they lie on two perpendicular layers and can be connected by one via between these two layers; or if these wires lie on the same layer but can be connected by a wire of a relatively short length that also belongs to the same layer. Creating the clusters therefore may include creating some new vias, to pursue the first condition, and creating some new short connecting wires, to pursue the second condition. An illustrative example of this is depicted in FIG. 25. The original shielding wires of one region are depicted at 2501, prior to clusterization. The same shielding wires are again depicted at 2511, after clusterization, in which two clusters 2521, 2523 have been formed, to include the original shielding wires in the region. These include newly created, in-layer, short wire segments 2531, and newly created vias 2533 (the vias shown in cross-section, with the vias being plane-perpendicular in this view, to connect between layers).

Algorithm 2300 next includes step 2307, of evaluating whether there are any clusters not yet connected to ground. If there are, a set of steps 2309-2315 may be applied iteratively until there no longer remain any clusters not yet connected to ground.

The distance between two clusters of wires (or distance between a cluster and auxiliary ground wires) is a minimal length of routing paths that connects some wire of the first cluster with some wire of the second cluster (or some wire of cluster with some auxiliary ground wire). The length of the routing path is the sum of lengths of wires of this path. In the present illustrative example, two points of a grid network may be classified as neighboring points if and only if two conditions are met: first, these points have the same coordinates and lie on the different layers such that they allow a via to connects these two points between the layers; or, both these points lie on the same layer and these points can be connected by one wire with length 1, meaning that these points are not blocked by some signal wire or some other blockage.

To perform the step 2309 of finding a minimal distance D between a pair of clusters, and to find out all the clusters that can be connected to some auxiliary ground wire by a path of length less than D, the following steps can be performed, in an illustrative example:

1. Let N be the number of clusters.

2. Label all points of the grid network that belong to some wire of k-th cluster (k=1,2, ... N) by a pair of integers (k, 0).

3. For each T=1, 2, 3, 4, ... perform the following actions 4-6.

4. If there is a pair of neighbor points of grid network with labels $(k_1,t_1)$ and $(k_2,t_2)$ such that $k_1 \ne k_2$, then stop the process. The minimal distance between 2 clusters is $D=t_1+t_2$ and pair of clusters is $k_1$ and $k_2$.

5. If there is a point labeled (k,T−1) that has some neighbor point belonging to some auxiliary ground wire, then the cluster k can be connected to this ground wire by some path of length less than D.

6. Examine all unlabeled points that are neighbors of points having a label (k,T−1) and assign a label (k,T) to them (k=1, 2, ... N).

This method finds not only a minimal distance between a pair of clusters, but also constructs the corresponding routing paths for connecting two clusters in one new cluster and for connecting some cluster to auxiliary ground wires. These connections are shown at 2600 and 2650, respectively, in FIG. 26, with a connection of one cluster k1 to another cluster k2 at 2600, and of one cluster k to an auxiliary ground wire 2661, at 2650. This thereby provides an illustrative example of performing the steps in algorithm 2300, of step 2311, to connect clusters to auxiliary ground wires if the length of the connection is not greater than D, and remove these clusters from further consideration; step 2313, of evaluating whether such clusters exist; and step 2315, of connecting pairs of clusters into one cluster if the distance between these clusters is not greater than D. Once those steps are performed to the point where there are no longer any shielding clusters not yet connected to ground, then step 2317 may be performed, of removing any unused auxiliary wires. Finally, then, step 2319 is performed, of outputting the final shielding for the netlist.

Although the present disclosure has been described with reference to particular illustrative embodiments, workers skilled in the art will recognize that changes may be made in form and detail without departing from the disclosure or the claims herein. As one illustrative example, components that may be described in a particular embodiment may be equivalently provided in one single integrated circuit chip, or with components distributed over two or more integrated circuit chips, or with various integrated circuit chips distributed over a computer motherboard or other circuit board, or with some or all elements distributed over other types of circuits, computing device elements, and other hardware and software resources. As another illustrative example, it is well understood that any instance of an element being described "illustratively" or as an "illustrative example" means in part that it refers to just one possible embodiment out of a wide variety of other embodiments with other configurations that differ from those explicitly described herein, but that will be understood by those skilled in the art also to lie within the scope of the subject matter defined by the appended claims. As another illustrative example, method steps described above may be performed by one or more integrated circuit chips, or with one or more or all of the method steps performed on other types of hardware or software elements. Many other variations among different embodiments may also be made within the metes and bounds of the subject matter described by the present disclosure and defined by the claims recited below.

What is claimed is:

1. A method comprising performing the following steps with a computing device:
   receiving a netlist comprising components and connections among the components;
   identifying a plurality of net groups, each comprising at least some of the connections for which equivalent routing is desired; and
   for each net group, systematically routing connection paths between the components for the connections, each connection path extending between an output of one of the components and an input to at least one other of the components and comprising path fragments,
   wherein routing comprises, for the connections of the net group, providing the same number of corresponding path fragments in a first of the connection paths in the net group as in a second of the connection paths in the net group, and routing the path fragments such that a plurality of the path fragments in the first connection path have equal lengths and equal orientations as corresponding path fragments in the second connection path.

2. The method of claim 1, wherein some of the plurality of path fragments in each of the first and second connection paths are routed on different layers of a substrate and wherein routing comprises, for each of the plurality of path fragments of the first connection path, routing that path fragment in the same layer of the substrate as the corresponding path fragment of the second connection path.

3. The method of claim 1, wherein
   routing comprises routing all of the connection paths in all of the net groups simultaneously.

4. The method of claim 1, wherein identifying a plurality of net groups comprises identifying a group of the connections having a common signal origin.

5. The method of claim 1, wherein identifying a plurality of net groups comprises identifying a group of the connections having a parallel signal origin within the netlist.

6. The method of claim 1, wherein each of the net groups corresponds to the connections between the components of a respective heterogeneous logic block within the netlist.

7. The method of claim 1, wherein the steps of identifying a plurality of net groups and routing comprises a systematic, single-iteration process for reducing skew timing differences along the connection paths between the components of each of the net groups.

8. The method of claim 1, wherein the step of routing the path fragments such that the plurality of the path fragments in the first connection path have equal lengths and equal orientations as corresponding path fragments in the second connection path is performed by adding a wire extension to at least one of the plurality of the path fragments in at least one of the first and second connection paths without changing placement of any of the components in the netlist.

9. The method of claim 1, wherein:
   the first connection path comprises a signal net extending from an output of a first component in the netlist and an input of a second component in the netlist;
   the second connection path comprises a signal net extending from the output of the first component in the netlist and an input of a third component in the netlist; and
   the first and second signal nets have the same number of path fragments, and corresponding path fragments in the first and second signal wires have equal lengths and equal orientations.

10. A non-transitory medium comprising executable instructions capable of being read and executed by a computing system and thereby configuring the computing system to receive a logic design and to provide a corresponding physical design embodying the logic design, wherein the computing system executing the instructions performs a method comprising:

receiving a netlist comprising components and connections among the components;

identifying a plurality of net groups, each comprising at least some of the connections for which equivalent routing is desired; and for each net group, systematically routing connection paths between the components for the connections, each connection path extending between an output of one of the components and an input to at least one other of the components and comprising path fragments, wherein routing comprises, for the connections of the net group, providing the same number of corresponding path fragments in a first of the connection paths in the net group as in a second of the connection paths in the net group, and routing the path fragments such that a plurality of the path fragments in the first connection path have equal lengths and equal orientations as corresponding path fragments in the second connection path.

11. The non-transitory medium of claim 10, wherein: routing comprises routing all of the connection paths in all of the net groups simultaneously.

12. The non-transitory medium of claim 10, wherein identifying a plurality of net groups comprises identifying a group of the connections having a common signal origin.

13. The non-transitory medium of claim 10, wherein identifying a plurality of net groups comprises identifying a group of the connections having a parallel signal origin within the netlist.

14. The non-transitory medium of claim 10, wherein each of the net groups corresponds to the connections between the components of a respective heterogeneous logic block within the netlist.

15. The non-transitory medium of claim 10, wherein the steps of identifying a plurality of net groups and routing comprises a systematic, single-iteration process for reducing skew timing differences along the connection paths between the components of each of the net groups.

16. The non-transitory medium of claim 10, wherein the step of routing the path fragments such that the plurality of the path fragments in the first connection path have equal lengths and equal orientations as corresponding path fragments in the second connection path is performed by adding a wire extension to at least one of the plurality of the path fragments in at least one of the first and second connection paths without changing placement of any of the components in the netlist.

17. The non-transitory medium of claim 10, wherein:

the first connection path comprises a signal net extending from an output of a first component in the netlist and an input of a second component in the netlist;

the second connection path comprises a signal net extending from the output of the first component in the netlist and an input of a third component in the netlist; and the first and second signal nets have the same number of path fragments, and corresponding path fragments in the first and second signal wires have equal lengths and equal orientations.

* * * * *